United States Patent
Takahashi et al.

(10) Patent No.: US 8,599,138 B2
(45) Date of Patent: Dec. 3, 2013

(54) INFORMATION PROCESSING APPARATUS, INFORMATION PROCESSING METHOD AND COMPUTER PROGRAM

(75) Inventors: Kazuma Takahashi, Kanagawa (JP); Manabu Yasumi, Tokyo (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 12/838,822

(22) Filed: Jul. 19, 2010

(65) Prior Publication Data

US 2011/0050579 A1 Mar. 3, 2011

(30) Foreign Application Priority Data

Aug. 25, 2009 (JP) .................................. 2009-194115

(51) Int. Cl.
*G06F 3/02* (2006.01)

(52) U.S. Cl.
USPC ........... 345/168; 345/157; 345/158; 345/159; 345/160; 345/161; 345/162; 345/163; 345/164; 345/165; 345/166; 345/167; 345/169; 345/170; 345/171; 345/172; 345/173; 345/174; 345/175; 345/176; 345/177; 345/178; 345/179; 345/180; 345/181; 345/182; 345/183; 345/184; 715/222; 178/18.01; 178/18.02; 178/18.03; 178/18.04; 178/18.05; 178/18.06; 178/18.07; 178/18.09; 178/18.11

(58) Field of Classification Search
USPC .......... 345/156–184; 178/18.01–18.08, 18.11
See application file for complete search history.

(56) References Cited

U.S. PATENT DOCUMENTS

| 6,556,878 B1 * | 4/2003 | Fielding ........................... 700/83 |
| 2008/0270901 A1 * | 10/2008 | Muto et al. .................... 715/705 |
| 2008/0291173 A1 * | 11/2008 | Suzuki ........................... 345/173 |
| 2009/0037837 A1 * | 2/2009 | Raghunath et al. ........... 715/773 |

FOREIGN PATENT DOCUMENTS

| JP | 2002-123356 A | 4/2002 |
| JP | 2007-11974 | 1/2007 |
| JP | 2007-080039 A | 3/2007 |
| JP | 2007-199882 A | 8/2007 |
| JP | 2008-40984 | 2/2008 |

OTHER PUBLICATIONS

Office Action issued Feb. 26, 2013, in Japanese Patent Application No. 2009-194115, filed Aug. 25, 2009.
Office Action issued May 28, 2013 in Japanese Patent Application No. 2009-194115.

* cited by examiner

*Primary Examiner* — Alexander S Beck
*Assistant Examiner* — Jeffrey Steinberg
(74) *Attorney, Agent, or Firm* — Oblon, Spivak, McClelland, Maier & Neustadt, L.L.P.

(57) ABSTRACT

An information processing apparatus is provided which includes a position acquisition unit for obtaining a display position of an input area in a display area, and a display control unit for controlling, based on the display position of the input area, in the display area a display position of an input operation area in which a character to be displayed in the input area is input. The display control unit displays the input area near the display position of the input area, and makes the input operation area follow the movement of the input area when the display position of the input area is moved.

10 Claims, 23 Drawing Sheets

AIR MODE    MOUSE MODE

FIG. 1
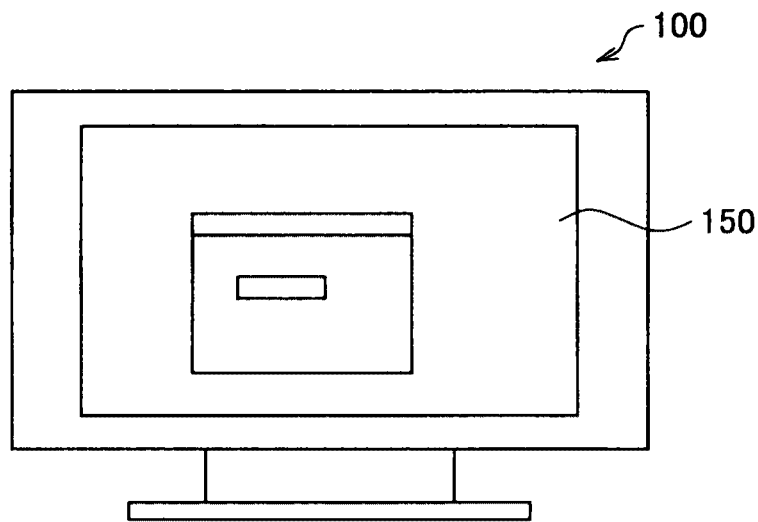
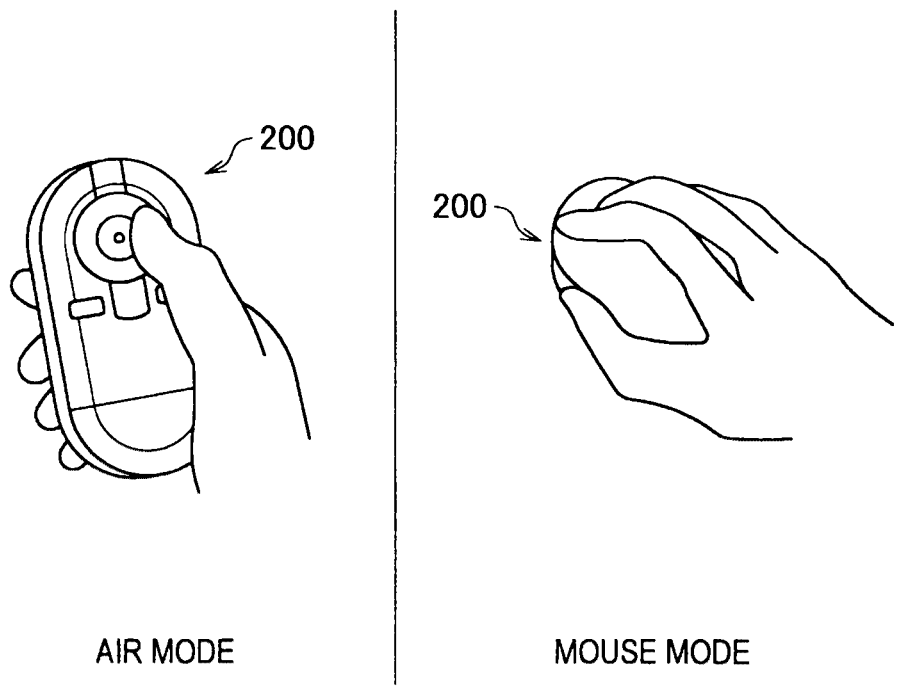
AIR MODE | MOUSE MODE

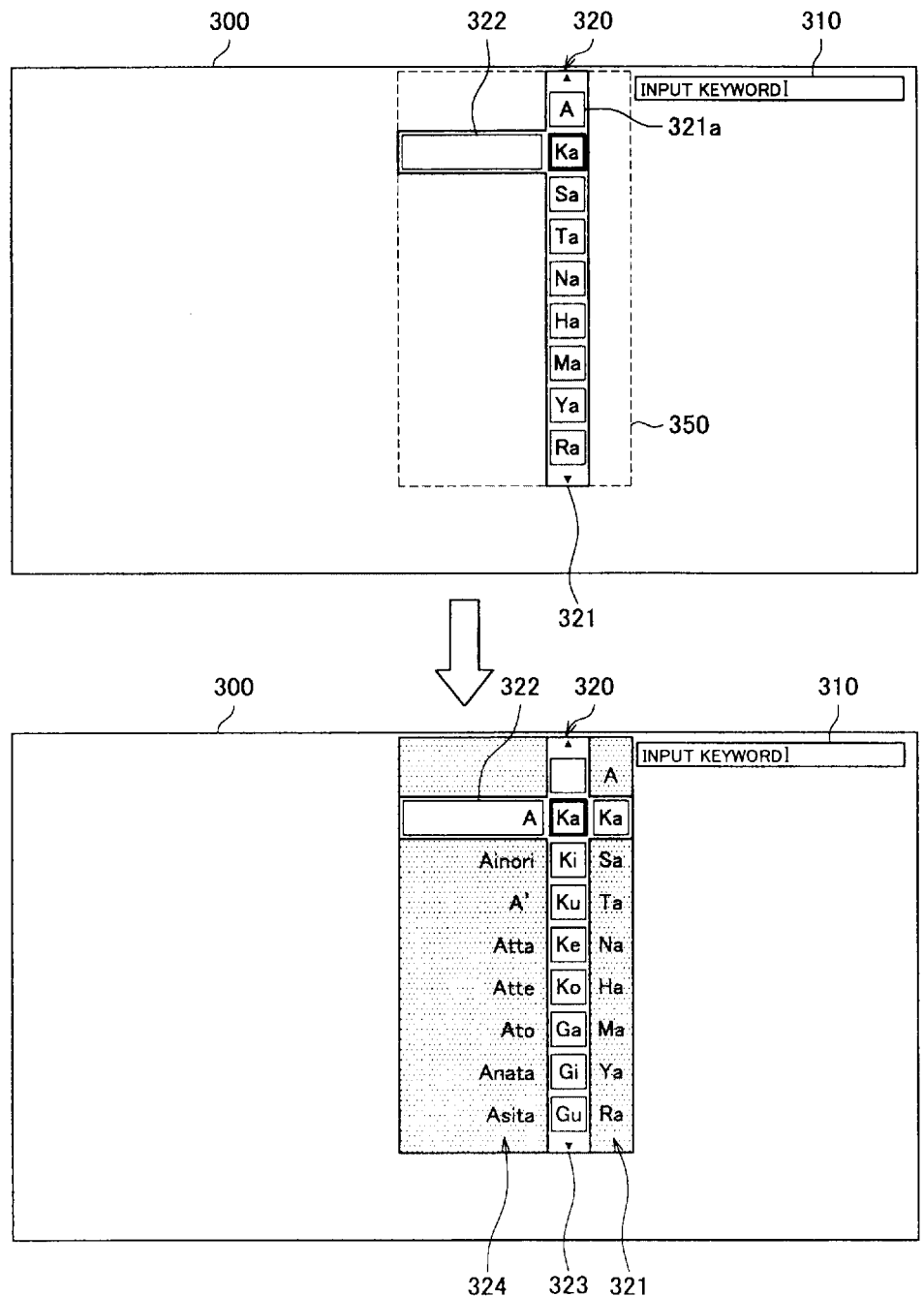

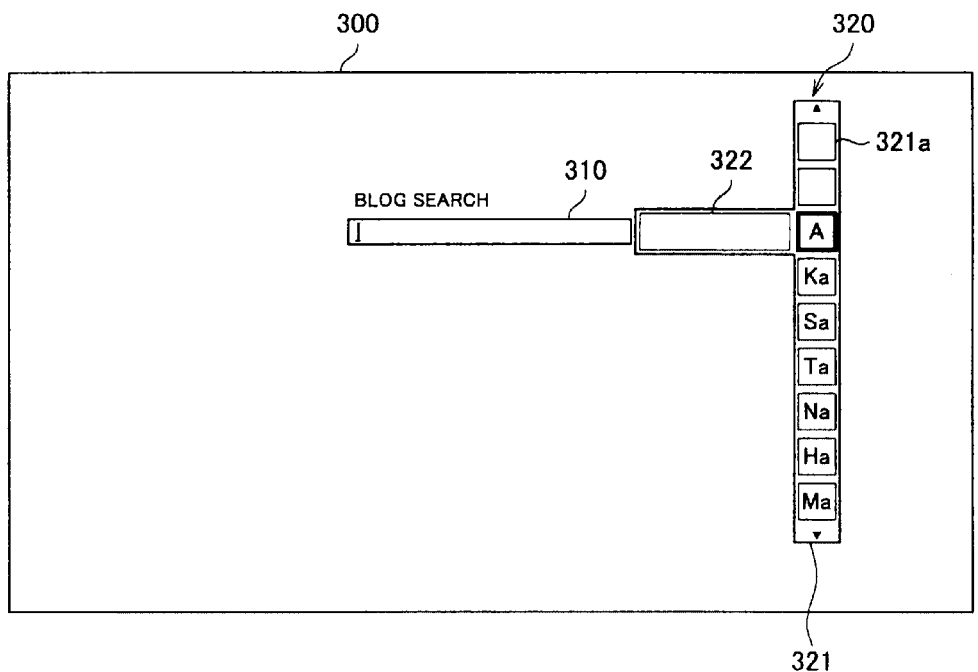
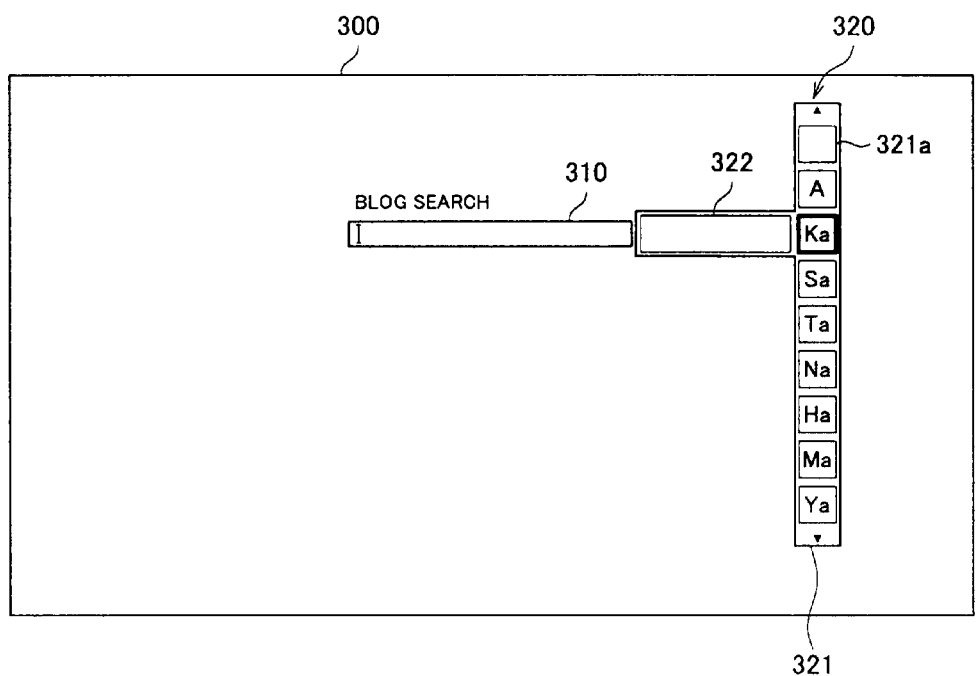

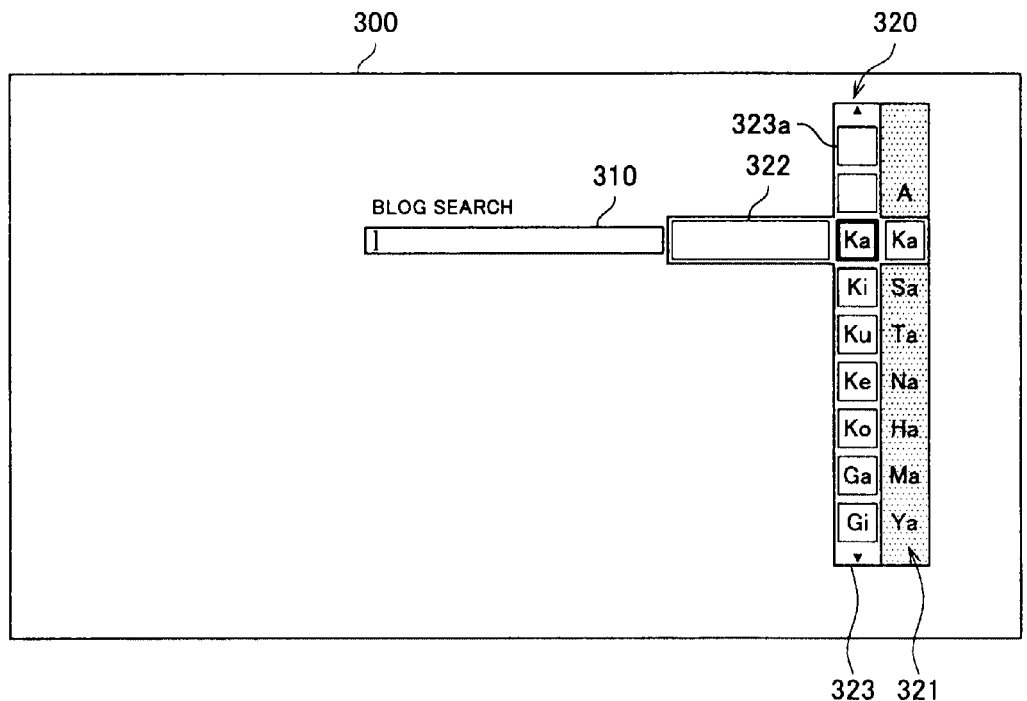
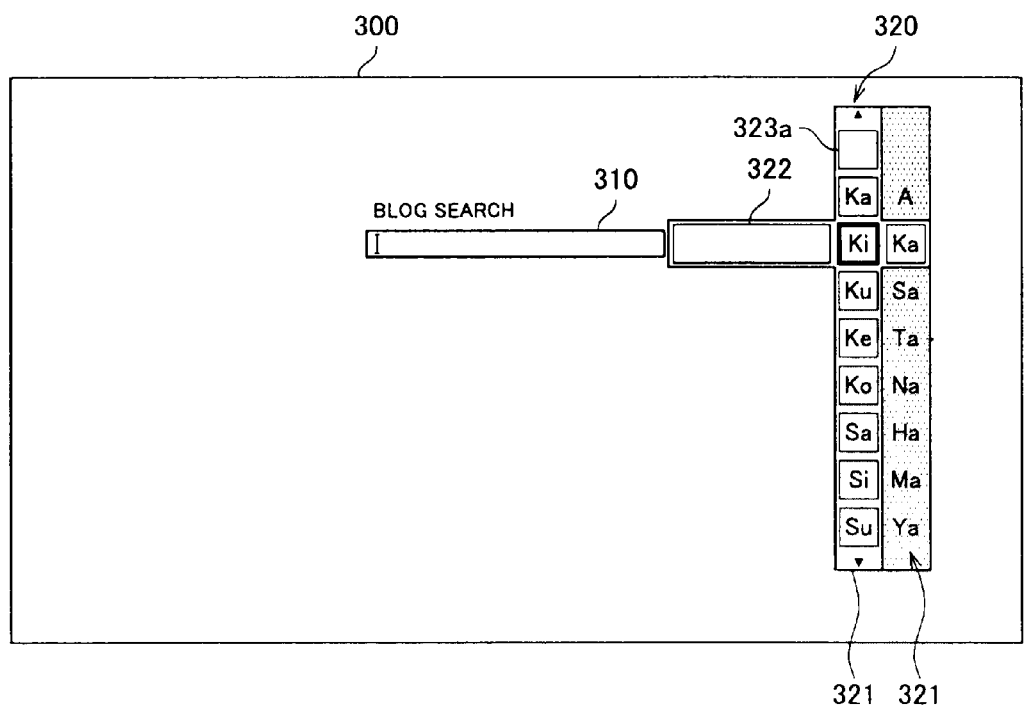

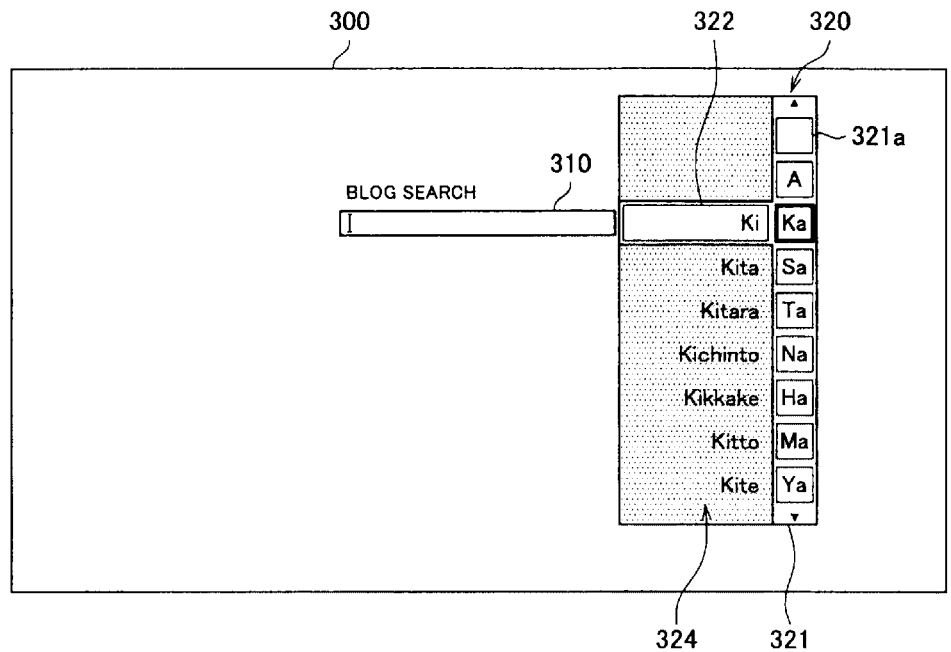
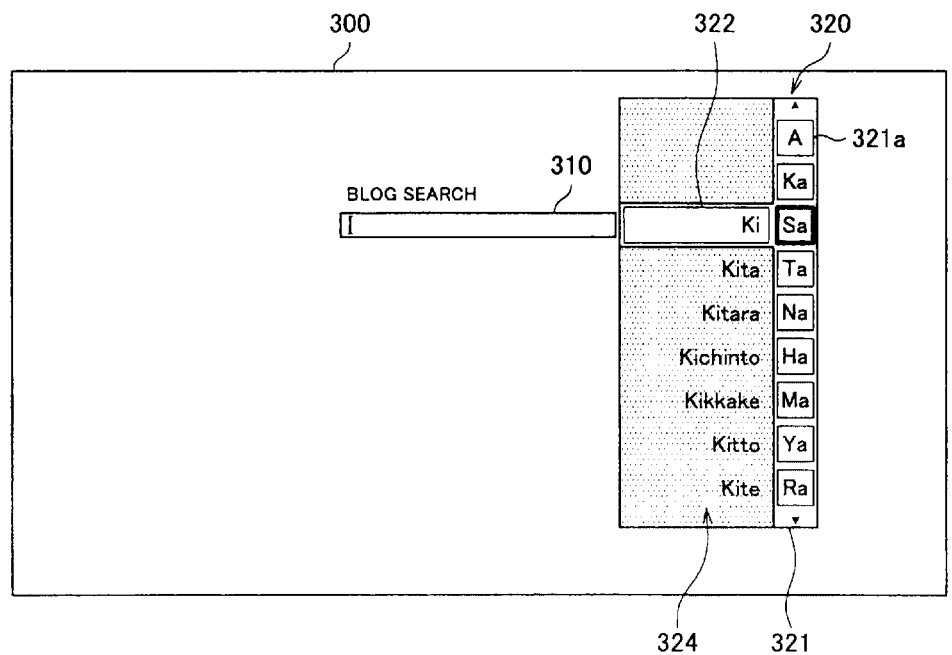

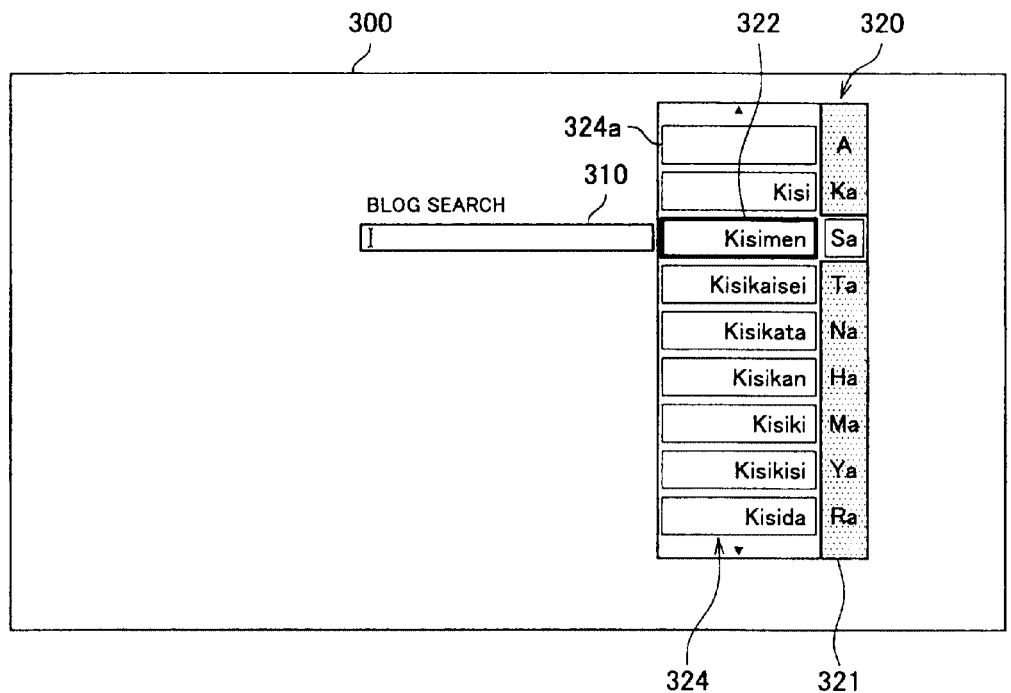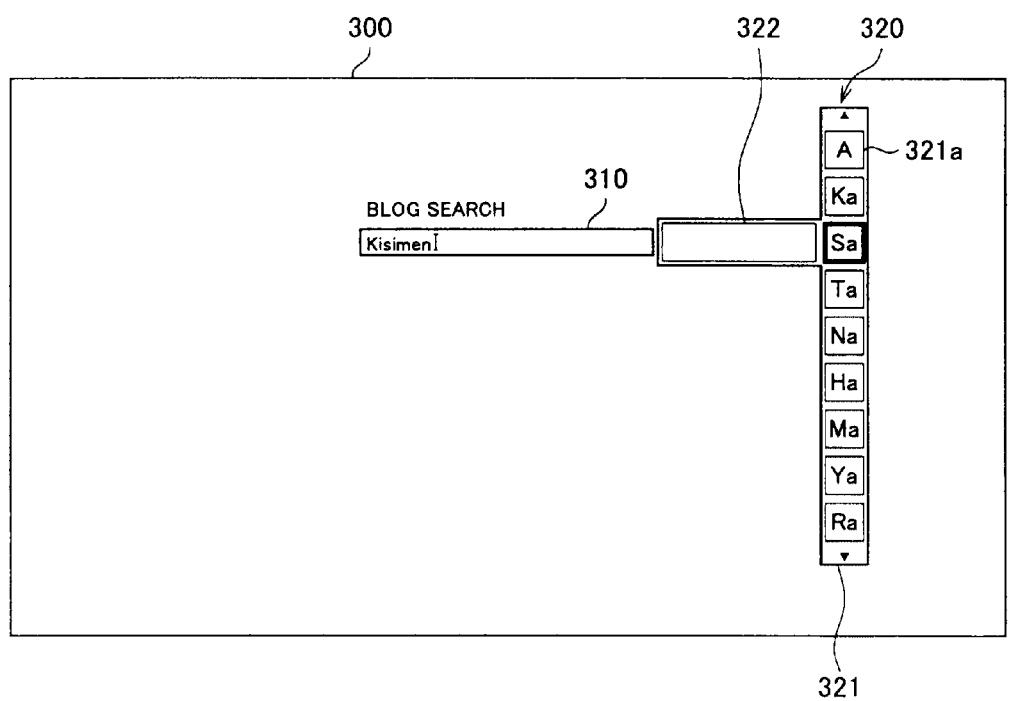

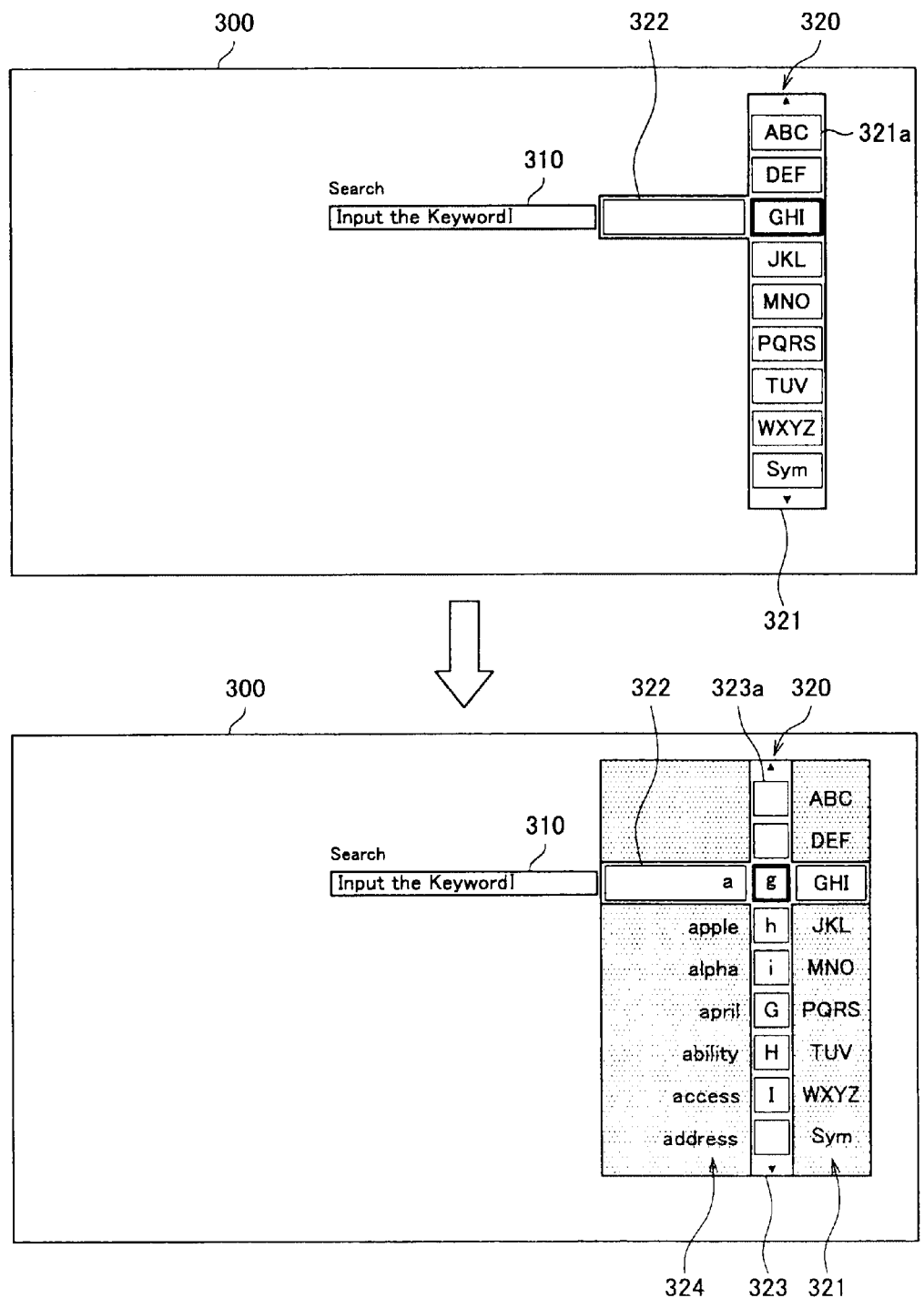

INFORMATION PROCESSING APPARATUS, INFORMATION PROCESSING METHOD AND COMPUTER PROGRAM

BACKGROUND OF THE INVENTION

1. Field of the Invention

The present invention relates to an information processing apparatus, an information processing method and a computer program, more specifically, to an information processing apparatus, an information processing method and a computer program for controlling content displayed in a display area.

2. Description of the Related Art

A keyboard is generally used as an input device for entering a word. In recent years, a software keyboard for entering a word or the like on screen, which is not a physical keyboard, has been also increasingly used. A user can enter a word by selecting keys of the software keyboard displayed on the screen of a display device with a mouse, or by touching displayed keys in the case where a touch panel is provided in a display area where the software keyboard is displayed.

An example of the situation of entering a word by using a software keyboard is the case of entering a keyword into an input area displayed in a displayed area at the time of performing keyword search on a search screen (e.g., JP-A-2007-11974). The software keyboard provided in JP-A-2007-11974 includes many keys such as kana character input keys, conversion keys for converting an input word, and keys for entering, cancelling or deleting an input word.

SUMMARY OF THE INVENTION

However, a software keyboard as such described above has many keys, so that a large portion of the display area is occupied. Consequently, it was difficult to cause information other than the input area and the software keyboard to be displayed at the time of entering a word. Moreover, a software keyboard is generally displayed at a display position which has been set in advance, independently of the display position of the input area. Consequently, a software keyboard is sometimes displayed at a position apart from the display position of the input area. In such display state, eyes have to move a lot between the software keyboard and the input area, which thus causes reduction of operability and user's fatigue at the time of operation.

In light of the foregoing, it is desirable to provide an information processing apparatus, an information processing method and a computer program which are novel and improved, and which are capable of realizing a word input means on a display area by which word input is facilitated.

According to an embodiment of the present invention, there is provided an information processing apparatus including a position acquisition unit for obtaining a display position of an input area in a display area, and a display control unit for controlling, based on the display position of the input area, in the display area a display position of an input operation area in which a character to be displayed in the input area is input. The display control unit displays the input area near the display position of the input area, when the display position of the input area is moved, the display control unit makes the input operation area follow the movement of the input area.

According to the present invention, when the display position of the input area in the display area is changed, the display control unit moves the input operation area based on the display position of the input area obtained by the position acquisition unit. The display control unit makes the input operation area follow the input area and be displayed near the input area, and thereby character input on the display screen can be facilitated.

Here, the input operation area may include a list display part in which one or more input candidates which are characters that can be displayed in the input area are indicated, and a focus part in which a focused character in the list display part is indicated, and the focus part may be displayed in line with the input area.

Moreover, the list display part may be displayed by arranging the one or more input candidates in a direction substantially orthogonal to an array direction of the input operation area and the focus part.

Furthermore, when a character is selected from the list display part, the display control unit may display an expected character list display part in which one or more expected characters expected to be input based on the selected character are arranged substantially parallel to the list display part.

Moreover, the information processing apparatus may include a movement information input unit for inputting movement information for moving the list display part in the array direction of the one or more input candidates. At this time, an input direction of inputting the movement information may be substantially the same as the array direction of the one or more input candidates of the list display part.

According to another embodiment of the present invention, there is provided an information processing method, including the steps of obtaining a display position of an input area in a display area, displaying near the display position of the input area an input operation area in which a character to be displayed in the input area is input, and making the input operation area follow the movement of the input area when the display position of the input area is moved.

According to another embodiment of the present invention, there is provided a computer program for causing a computer to function as the information processing apparatus described above. The computer program is stored in a storage device included in the computer, and it is read and executed by a CPU included in the computer, thereby causing the computer to function as the information processing apparatus described above. Moreover, there is also provided a computer readable recording medium in which the computer program is stored. The recording medium may be a magnetic disk, an optical disk and the like, for example.

According to the embodiments of the present invention described above, the information processing apparatus, the information processing method, and the computer program can be provided that can realize a word input means on a display area by which word input is facilitated.

BRIEF DESCRIPTION OF THE DRAWINGS

FIG. 1 is an explanatory diagram showing a schematic configuration of an input unit according to an embodiment of the present invention;

FIG. 13 is an explanatory diagram showing a display example of the software keyboard of the time when the display position control of the software keyboard is performed by the information processing apparatus according to the embodiment;

FIG. 14A is an explanatory diagram showing a word input procedure by using the software keyboard according to the present embodiment;

FIG. 14B is an explanatory diagram showing a word input procedure by using the software keyboard according to the present embodiment;

FIG. 14C is an explanatory diagram showing a word input procedure by using the software keyboard according to the present embodiment;

FIG. 14D is an explanatory diagram showing a word input procedure by using the software keyboard according to the present embodiment;

FIG. 14E is an explanatory diagram showing a word input procedure by using the software keyboard according to the present embodiment;

FIG. 14F is an explanatory diagram showing a word input procedure by using the software keyboard according to the present embodiment;

FIG. 14K is an explanatory diagram showing a word input procedure by using the software keyboard according to the present embodiment;

FIG. 14L is an explanatory diagram showing a word input procedure by using the software keyboard according to the present embodiment;

FIG. 15 is an explanatory diagram showing a configuration example of a software keyboard for inputting alphabetical letters;

DETAILED DESCRIPTION OF THE EMBODIMENT

Figure 2:
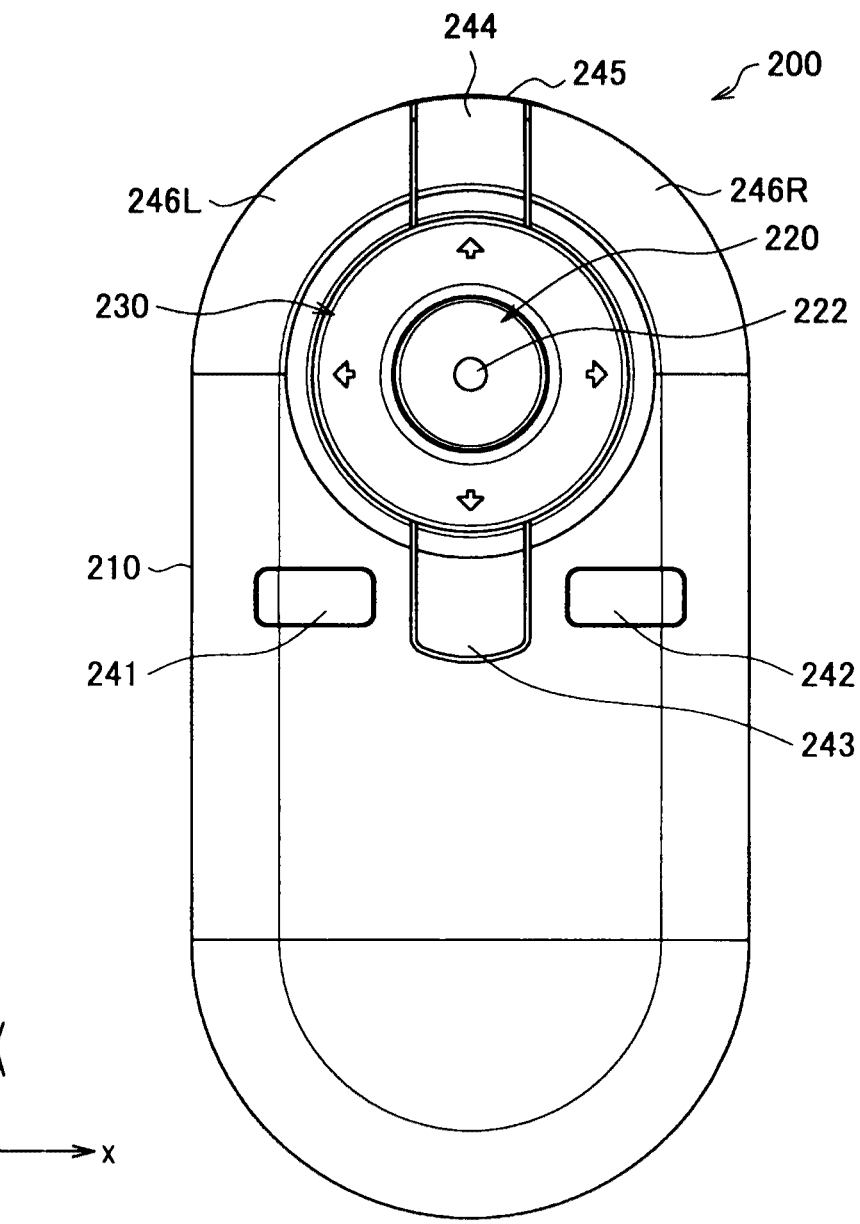
FIG. 2 is a top view showing an input device according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Outline of input unit
2. Display control of software keyboard by information processing apparatus
3. Hardware configuration example <1. Outline of Input Unit>

First, a configuration example of an input unit using an information processing apparatus according to the present embodiment will be described based on FIG. 1 and FIG. 2. In addition, FIG. 1 is an explanatory diagram showing a schematic configuration of the input unit according to the present embodiment. FIG. 2 is a top view showing an input device according to the present embodiment. In addition, in the following, the description will be made, taking the horizontal direction of an input device 200 as x direction, taking the vertical direction (the longitudinal direction) of the input device 200 as y direction, and taking the height direction of the input device 200 as z direction. Moreover, it is defined that the horizontal direction of a display area (reference numeral 300 in FIG. 3) is x direction and the vertical direction of the display area is y direction.

The input unit according to the present embodiment includes an information processing apparatus 100 for controlling content displayed on a display unit 150 of a display device, based on input information, and an input device 200 for inputting the input information.

The input device 200 according to the present embodiment has two modes: mouse mode for functioning as a mouse, and air mode for functioning as a remote controller. In the case of the mouse mode, a user can input input information in the same manner as using a general mouse, such as by moving the input device 200 and/or by or pressing a button on the input device 200 while it is on the desk. On the other hand, in the case of the air mode, the user holds the input device 200 and holds a button down with a thumb and/or slides the thumb on an operation area, thereby enabling to input input information. The mouse mode and the air mode of the input device 200 can be switched by pressing a switch button (reference numeral 245 in FIG. 2) provided to the input device 200, for example.

If specifically described, the input device 200 of the present embodiment includes a housing 210 having a substantially long elliptical shape, and a plurality of operation units provided on the top surface and on the side surfaces of the housing 210, as shown in FIG. 2. In the housing 210, the top surface and the back surface are formed substantially flat and the outer edge is rounded. The corners of the housing 210 are rounded behind (the side in the negative direction of the y axis) the area where the operation units for inputting information are provided, and thereby the input device 200 is easily held and erroneous operation is reduced.

The operation units are members operated for inputting information, which include a sensor unit 220, a cursor unit 230, and buttons 241 to 246 (L, R), for example. The sensor unit 220 is a detection unit for detecting the travel distance of a finger moved on the surface of the sensor 220, which includes an optical pointing device 222 and an operation surface 224 whose flat surface has a substantially circle shape. The sensor unit 220 detects the fingerprint of the finger moved on the operation surface 224 by the optical pointing device 222 and generates input information for operating an object from the travel distance of the fingerprint.

The cursor unit 230 is a ring-shaped button surrounding the sensor unit 220. By being pressed with a finger, the cursor unit 230 can move an operation object in the vertical direction (y direction) or in the horizontal direction (x direction) according to the pressed position.

The buttons 241 to 246 (L, R) outputs associated input information by being pressed. For example, the buttons 241, 242, 243, and 244 can be associated with processing for undoing operation, with key board display processing for displaying a software keyboard on a display unit, with determination processing for determining operation, and with menu display processing for displaying a menu screen. Moreover, the button 245 can be associated with switching processing of the mouse mode and the air mode or with scroll processing which allows scroll operation of displayed content. The buttons 246L and 246R can be associated with functions of the left button and the right button of a general mouse when the input device 200 functions in the mouse mode.

The input information input from such input device 200 is transmitted to the information processing apparatus 100 and is processed. The information processing apparatus 100 is an apparatus for processing information to be displayed on a display device such as a personal computer, which can change displayed content of the display unit 150 based on the input information input from the input device 200.

In the present embodiment, by using such input unit, characters are input from the software keyboard displayed on the display unit 150. When a user uses the input device 200 to input information for operating the software keyboard, the information processing apparatus 100 which has received the input information executes word input processing based on the input information. When performing word input in this manner, the information processing apparatus 100 according to the present embodiment changes, as necessary, the display position of the software keyboard which is displayed on the display area and which is used for performing word input, according to the position of a text box in which input characters are displayed. This can facilitate the word input with the software keyboard.

<2. Display Control of Software Keyboard by Information Processing Apparatus>

Figure 3:
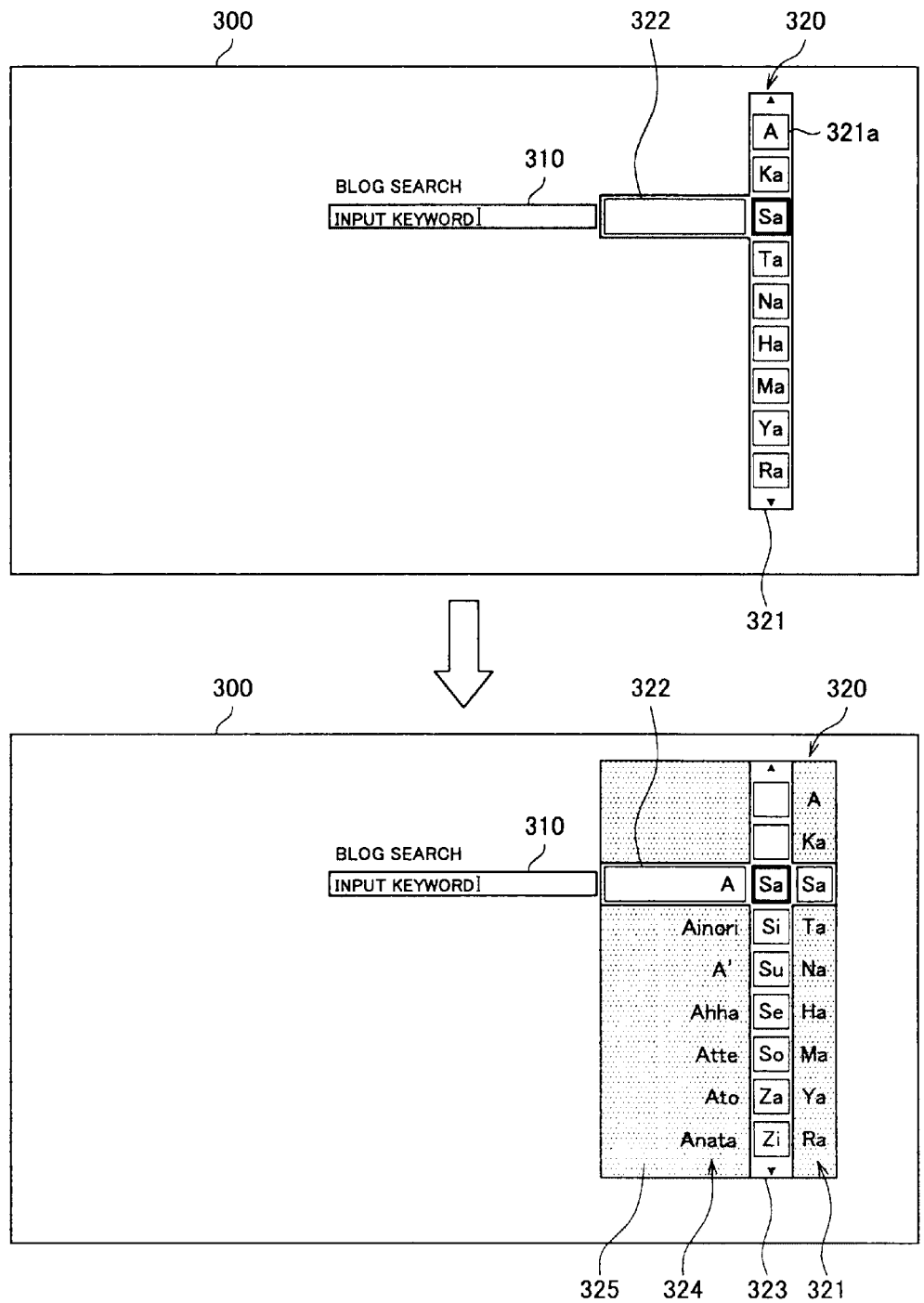
FIG. 3 is an explanatory diagram showing a configuration example of a software keyboard according to the embodiment.
Figure 4:
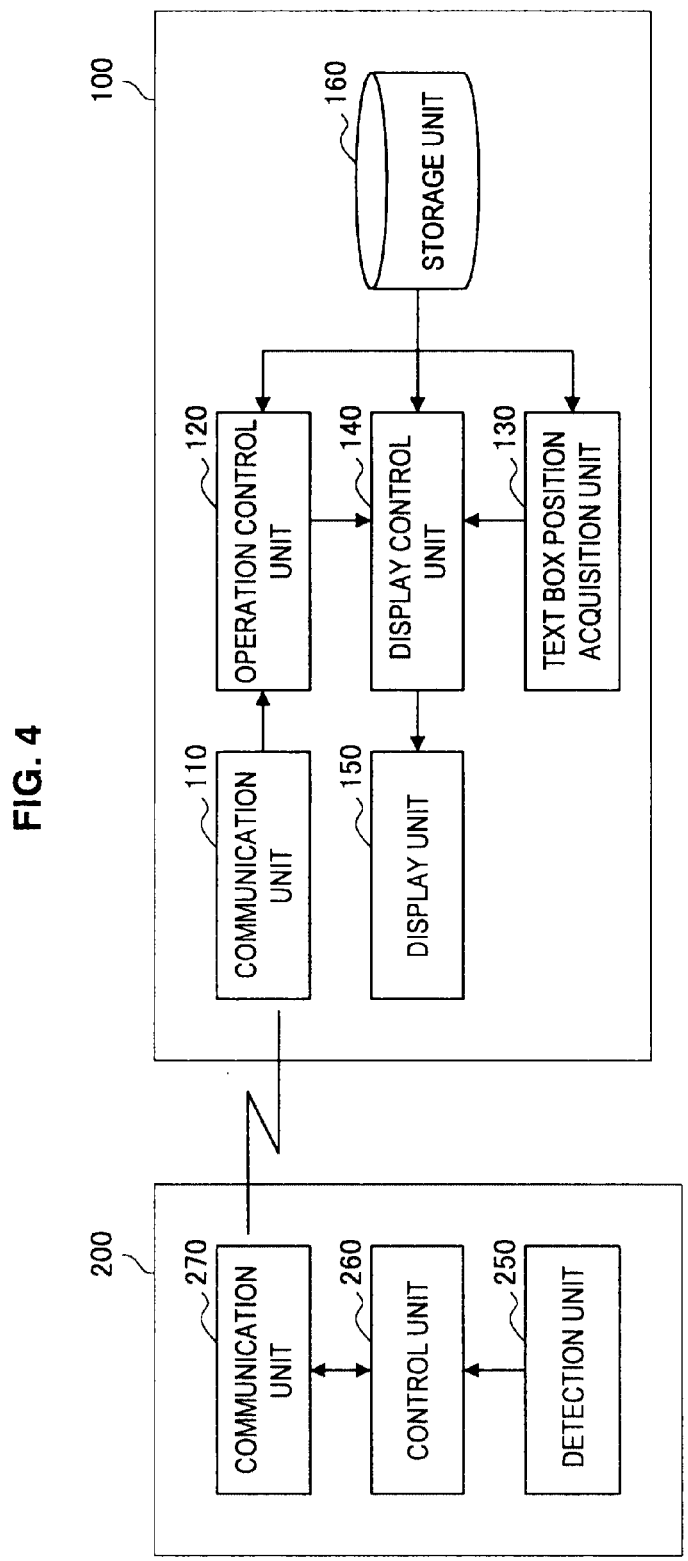
FIG. 4 is a block diagram showing a functional configuration of the input unit according to the embodiment.
Figure 5:
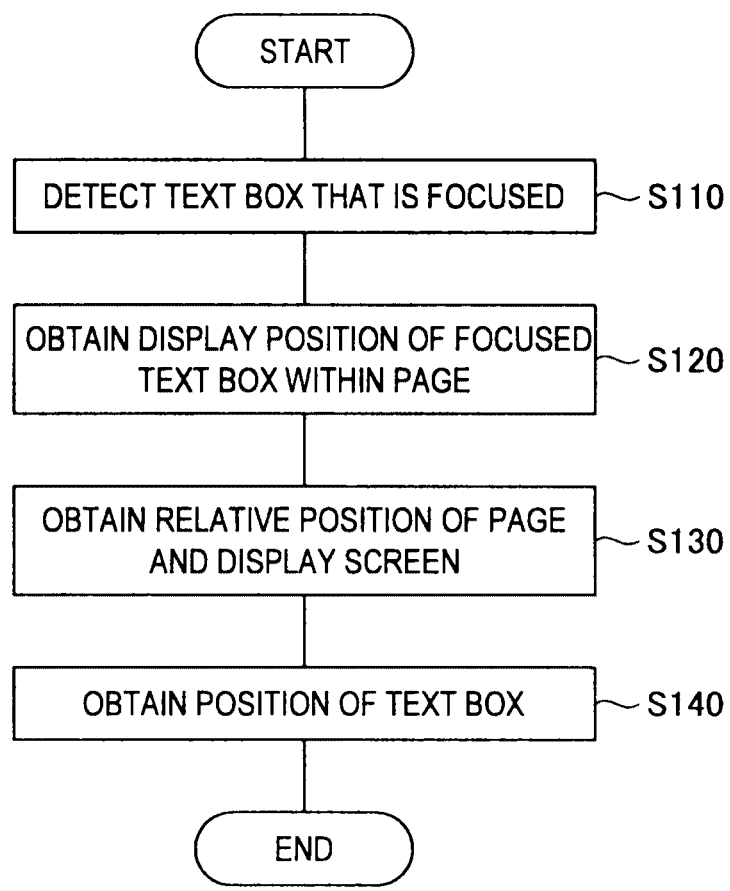
FIG. 5 is a flowchart showing position acquisition processing of a text box.
Figure 6:
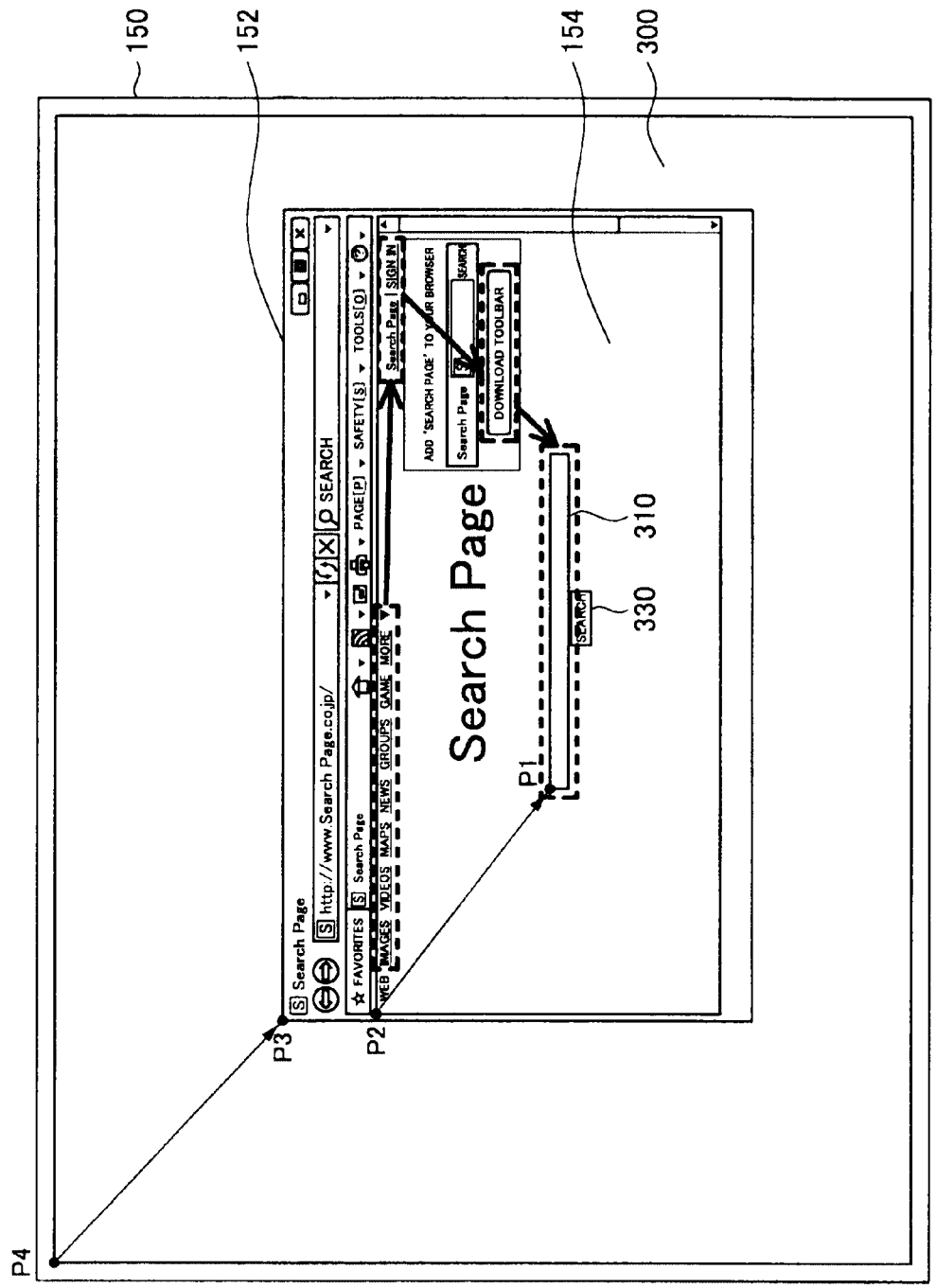
FIG. 6 is an explanatory diagram showing the position acquisition processing of the text box.

In the following, display control of the software keyboard by the information processing apparatus 100 of the input unit according to the present embodiment will be described in detail, based on FIG. 3 to FIG. 13. In addition, FIG. 3 is an explanatory diagram showing a configuration example of the software keyboard according to the present embodiment. FIG. 4 is a block diagram showing a functional configuration of the input unit according to the present embodiment. FIG. 5 is a flowchart showing position acquisition processing of a text box. FIG. 6 is an explanatory diagram showing the position acquisition processing of the text box. FIG. 7 to FIG. 13 are explanatory diagrams showing display examples of the software keyboard of the time when display position control of the software keyboard is performed by the information processing apparatus 100 according to the present embodiment.

[Configuration Example of Software Keyboard]

In the present embodiment, the case where a keyword is entered into an input area on a search screen by using the software keyboard will be described. It is assumed that characters entered here are kana characters. On the display area 300 of the display unit 150, there are displayed an input area 310 to which a keyword is entered and a software keyboard 320 for inputting characters to the input area 310, as shown in FIG. 3. The software keyboard 320 according to the present embodiment performs word input in a phased manner and includes, in its initial state, a first character list 321 on which initial characters are displayed and a focus part 322 for indicating a selected position, as shown in the upper diagram of FIG. 3.

The input area 310 is long in the horizontal direction and characters input from the software keyboard 320 are sequentially displayed from the left to the right of the input area 310. The first character list 321 is a plurality of cells which is associated with first characters and which is arranged in the vertical direction of the display area 300. Between the input area 310 and the first character list 321, the focus part 322 for indicating a character focused in the software keyboard 320 is displayed. The focus part 322 is displayed horizontally in line with the input area 310 and indicates that a cell 321a positioned at the intersection of the straight line and the first character list 321 is focused.

The software keyboard 320 according to the present embodiment initially has a form in which the first character list 321 and the focus part 322 are orthogonal to one another, but when inputting characters at higher positions of a word, the software keyboard 320 is expanded as shown in the lower diagram of FIG. 3. The lower diagram of FIG. 3 shows, in addition to the first character list 321 and the focus part 322, a subordinate character list 323 in which the subordinate kana characters subordinate to a first kana character and an expected word list 324 in which character strings expected to be entered are displayed, for example. In the expected word list 324, not only a word but also a character string which is not a meaningful element is displayed. The user operates the input device 200 to select a first kana character, a subordinate kana character, and an expected character string and to input a character string to the input area 310. In addition, a word input method using the software keyboard 320 will be described later.

In the present embodiment, the information processing apparatus 100 is used to move the content displayed on the display area 300 by, for example, scrolling it and to make the display position of the software keyboard 320 follow the input area 310 when the display position of the input area 310 is changed. This enables the input area 310 and the software keyboard 320 to be easily viewed at the same time, and this reduces the burden of moving eyes between the input area 310 and the software keyboard 320.

Moreover, as shown in FIG. 3, the area occupied by the software keyboard 320 according to the present embodiment is small in the display area 300. Since only the minimum input elements necessary for inputting characters are displayed in the initial state, the occupied area is especially small. Moreover, the software keyboard 320 only includes the first character list 321 extending in the vertical direction and the focus part 322 extending from the input area 310 in the horizontal direction. Consequently, an information display area in which the content other than the software keyboard 320 can be displayed can be taken large.

In the case of inputting characters at higher positions, the software keyboard 320 is expanded. Still, the maximum occupied area of the expanded software keyboard 320 is a rectangular area defined by the vertical length of the first character list 321 and by the horizontal lengths of the focus part 322 and the subordinate character list 323. Consequently, also in this case, large space can be secured in the area under the input area 310 and the information display area can be large. This makes it possible to enter a keyword into the input area 310 while viewing content (e.g., an information providing site or a research result) displayed on the information display area In this manner, the form and the display position of the software keyboard 320 according to the present embodiment can realize an input means which is compact and highly operable. The information processing apparatus 100 according to the present embodiment performs display position control of such software keyboard 320 and provides to users the word input means on the display area with which characters can be easily input and which is compact.

[Functional Configuration of Input Unit]

FIG. 4 shows a functional configuration of the input unit according to the present embodiment. The input unit according to the present embodiment includes, as described above, the information processing unit 100 and the input device 200. When the input unit is seen from the functional viewpoint, the information processing unit 100 includes a communication unit 110, an operation control unit 120, a text box position acquisition unit 130, a display control unit 140, the display unit 150, and a storage unit 160. Moreover, the input device 200 includes a detection unit 250, a control unit 260, and a communication unit 270. In addition, FIG. 4 only shows the functional units which function when operation control processing according to the present embodiment is performed, and the information processing unit 100 and the input device 200 may further include a functional unit for performing other processing.

The communication unit 110 of the information processing unit 100 is a functional unit for transmitting and receiving information to and from the input device 200. The communication unit 110 receives input information from the input device 200 and outputs the information to the operation control unit 120.

The operation control unit 120 operates the software keyboard 320 displayed on the display unit 150, based on the input information. The operation control unit 120 causes a list which is an operation object in the software keyboard 320 (the first character list 321, the subordinate character list 323, and the expected word list 324 in the case of FIG. 3) to be scrolled, based on the operation direction and the operation amount input by using the input device 200. Moreover, the operation control unit 120 selects and determines a focused character based on the input information input by operation of the input device 200 (e.g., operation such as pressing a determination button). The operation control unit 120 recognizes such operation of the software keyboard 320 and outputs the recognized result to the display control unit 140 as operation information.

The text box position acquisition unit 130 obtains the display position of the input area 310 (text box) in the display area 300. The text box position acquisition unit 130 obtains the input position from an application, a program or the like displaying the input area 310. The text box position acquisition unit 130 outputs the obtained display position of the input area 310 to the display control unit 140.

The display control unit 140 changes the display position and the display state of the software keyboard 320 and processes the software keyboard 320 into the form capable of being displayed on the display unit 150. At this time, the display control unit 140 causes the software keyboard 320 to be displayed near the input area 310, thereby facilitating word input to the input area 310. The display control unit 140 outputs to the display unit 150 the display information subjected to the display processing and causes the display unit 150 to display the display information.

The storage unit 160 stores therein information necessary for changing the display position and the display state of the software keyboard 320, and information to be used for obtaining the display position of the input area 310, for example. The storage unit 160 is a non-volatile memory such as a flash memory or a ROM 102, for example. The operation control unit 120, the text box position acquisition unit 130, and the display control unit 140 performs each operation by referring to the information stored in the storage unit 160.

On the other hand, the detection unit 250 of the input device 200 is a functional unit for detecting the position of a finger which is a detection object. By obtaining an image of the finger in a predetermined area, for example, the detection unit 250 detects an arbitrary point (e.g., fingerprint) of the finger in the area. The detection unit 250 outputs the obtained positional information of the finger to the control unit 260.

The control unit 260 calculates the moving direction and the moving distance of the finger based on the positional information input from the detection unit 250. The control unit 260 calculates the moving direction and the moving distance of the finger from the change of the arbitrary position of the finger by the passage of time, and from the information, the control unit 260 further calculates the speed and the acceleration. The control unit 260 outputs the calculated results to the communication unit 270 as input information. The detection unit 250 and the control unit 260 correspond to optical pointing device 222 in FIG. 2.

The communication unit 270 is a functional unit for transmitting and receiving information to and from the information processing apparatus 100. When the input information is input from the control unit 260, the communication unit 270 transmits the input information to the information processing apparatus 100.

The configuration of the information processing unit 100 and the input device 200 of the input unit according to the present embodiment has been described above. As described above, when the display position of the input area 310 is changed, the information processing unit 100 according to the present embodiment performs processing of moving the display position of the software keyboard 320 according to the movement of the input area 310. Thus, the information processing unit 100 obtains the display position of the input area 310 from the text box position acquisition unit 130 and determines the display position of the software keyboard 320 by the display control unit 140. The display position of the input area 310 can be obtained by using position acquisition processing shown in FIG. 5, for example.

[Display Position Acquisition Processing of Input Area]

First, a text box (the input area 310) that is focused is detected for obtaining the display position of the input area 310 in the display area 300 (step S110). For example, as shown in FIG. 6, there is assumed a case where web search is performed on a search page 152 displayed in the display area 300 of the display unit 150. Web search can be performed by entering a keyword into the input area 310 of the search page 152 and then pressing a search button 330. Here, when there is within the display area 300 a plurality of text boxes to which characters can be input, it is necessary to specify a text box to which characters are to be input, in order to move the software keyboard 320 to the proximity of the text box to which characters are to be input.

Consequently, at the step S110, the operation control unit 120 detects the object which is actually to be operated (namely, a focused object), from among the operable objects each of which can be pressed or to each of which a character string can be input on the search page 152. The object detection can be performed so as to specify the focused object by sequentially determining whether each of operable objects surrounded by a broken line is focused, as shown in FIG. 6, for example.

Next, the text box position acquisition unit 130 obtains the display position of the focused input area 310 within the search page 152 (step S120). The display position of the input area 310 within the search page 152 is, as shown in FIG. 6, is indicated by the relative position of a reference point P2 of a display area 154 (basic page for displaying content excluding a tool bar and the like) of the search page 152 and a reference point P1 of the input area 310. These reference points P1 and P2 have been set in advance and stored in the storage unit 160. The text box position acquisition unit 130 obtains the display position of the input area 310 in the search page 152, by a method, for example, of obtaining the coordinates of the reference point P1 of the input area 310 in a coordinate system with its origin at the reference point P2 of the display area 154.

Furthermore, the text box position acquisition unit 130 obtains the relative position between the display area 300 and the search page 152 (step S130). The relative position of the display area 300 and the search page 152 can be indicated, in the same manner as the step S120, by the relative position of a reference point P4 of the display area 300 and a reference point P3 of the search page 152. These reference points P3 and P4 have been also set in advance and stored in the storage unit 160. In addition, the reference point P3 of the search page 152 may be different from the reference point P2 of the display area 154 of the search page 152 used at the step S120. For example, a point whose positional relationship with the display area 300 is easily obtained may be set as the reference point P3 of the search page 152 as a whole. The text box position acquisition unit 130 obtains the display position of the search page 152 in the display area 300, by a method, for example, of obtaining the coordinates of the reference point P3 of the search page 152 in a coordinate system with its origin at the reference point P4 of the display area 300.

After that, the text box position acquisition unit 130 obtains the display position of the input area 310 in the display area 300 by using the relative position information obtained at the steps S120 and S130 (step S140). Here, the positional relationship between the reference points P2 and the P3 in the search page 152 is determined by the layout of the search page 152 and thus can be obtained. The text box position acquisition unit 130 obtains the relative position of the reference point P4 of the display area 300 and the reference point P1 of the input area 310 by the relative position of the reference point P2 of the display area 154 and the reference point P1 of the input area 310, the relative position of the reference point P4 of the display area 300 and the reference point P3 of the search page 152, and the positional relationship between the reference points P2 and the P3. The relative position of the reference points P4 and P1 is indicated the coordinates of the reference point P1 of the input area 310 in the coordinate system with its origin at the reference point P4.

By such method, the information processing apparatus 100 can obtain the display position of the input area 310 in the display area 300. When the display position of the input area 310 in the display area 300 is obtained by the text box position acquisition unit 130, the display control unit 140 determines the display position of the software keyboard 320 in the display area 300. Here, the positional relationship between the input area 310 and the software keyboard 320 has been set in advance. The display control unit 140 determines the display position of the software keyboard 320 from the display position of the input area 310 in the display area 300 and the positional relationship between the input area 310 and the software keyboard 320.

[Display Position Control of Software Keyboard]

In the present embodiment, based on the positional relationship that the input area 310 and the focus part 322 of the software keyboard 320 are displayed side by side in a horizontal row, the display control unit 140 causes the focus part 322 to be displayed at the position satisfying the positional relationship with the input area 310 described above. Then, the other elements (e.g., the first character list 321) constituting the software keyboard 320 are all displayed within the display area 300. That is, the positional relationship between the focus part 322 and the other elements changes according to the display position of the input area 310.

(Case Where Input Area is Displayed Near the Middle of Display Area)

For example, as shown in FIG. 3, when the input area 310 is displayed near the middle of the display area 300, the focus part 322 of the software keyboard 320 is displayed horizontally next to the input area 310. On the other hand, the first character list 321 is displayed so as to extend downward from the top of the area in which the software keyboard 320 can be displayed in the display area 300. Then, the display control unit 140 focuses a cell 321a which is closest to the intersection of the focus part 322 extending in the horizontal direction and the first character list 321. At this time, the display control unit 140 may correct the display position so as to bring it into proximity to the focus part 322. In FIG. 3, when the first character list 321 is displayed in this manner, the cell 321a of "Sa" which is adjacent to the focus part 322 is focused.

Figure 7:
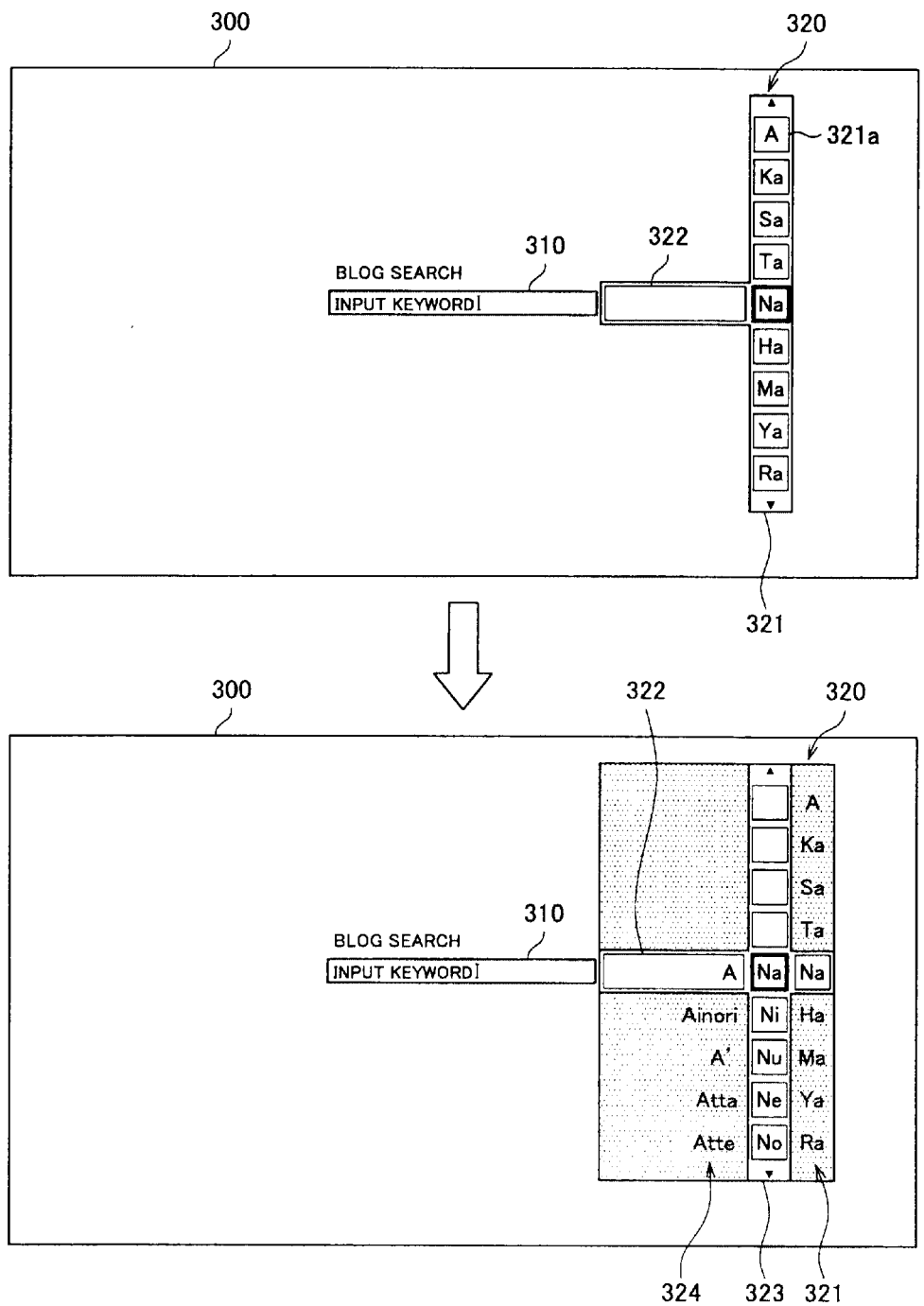
FIG. 7 is an explanatory diagram showing a display example of the software keyboard of the time when display position control of the software keyboard is performed by an information processing apparatus according to the embodiment.

In contrast, when the input area 310 displayed in the display area 300 is moved and displayed on the lower side of the screen compared to the state shown in FIG. 3, the display control unit 140 makes the display position of the focus part 322 follow the display position of the input area 310. For example, as shown in FIG. 7, when the input area 310 is moved to near the middle of the screen, the focus part 322 is also moved to near the middle of the screen with the movement of the input area 310. On the other hand, the first character list 321 is displayed, in the same manner as the above, so as to extend downward from the top of the area in which the software keyboard 320 can be displayed in the display area 300. Then, the display control unit 140 focuses the cell 321a "Na" which is closest to the intersection of the focus part 322 extending in the horizontal direction and the first character list 321.

In this manner, although the display position relationship between the input area 310 and the focus part 322 does not change by the display position of the input area 310 being moved, the display position relationship between the focus part 322 and the other elements of the software keyboard 322 changes. Then, even in the state where the first character list 321, the subordinate character list 323, and the expected word list 324 of the software keyboard 320 are displayed as shown in the lower diagram of FIG. 7, the maximum display area of the software keyboard 320 is secured. Consequently, all the keys can be displayed.

(Case Where Input Area is Displayed at the Bottom of Display Area)

Figure 8:
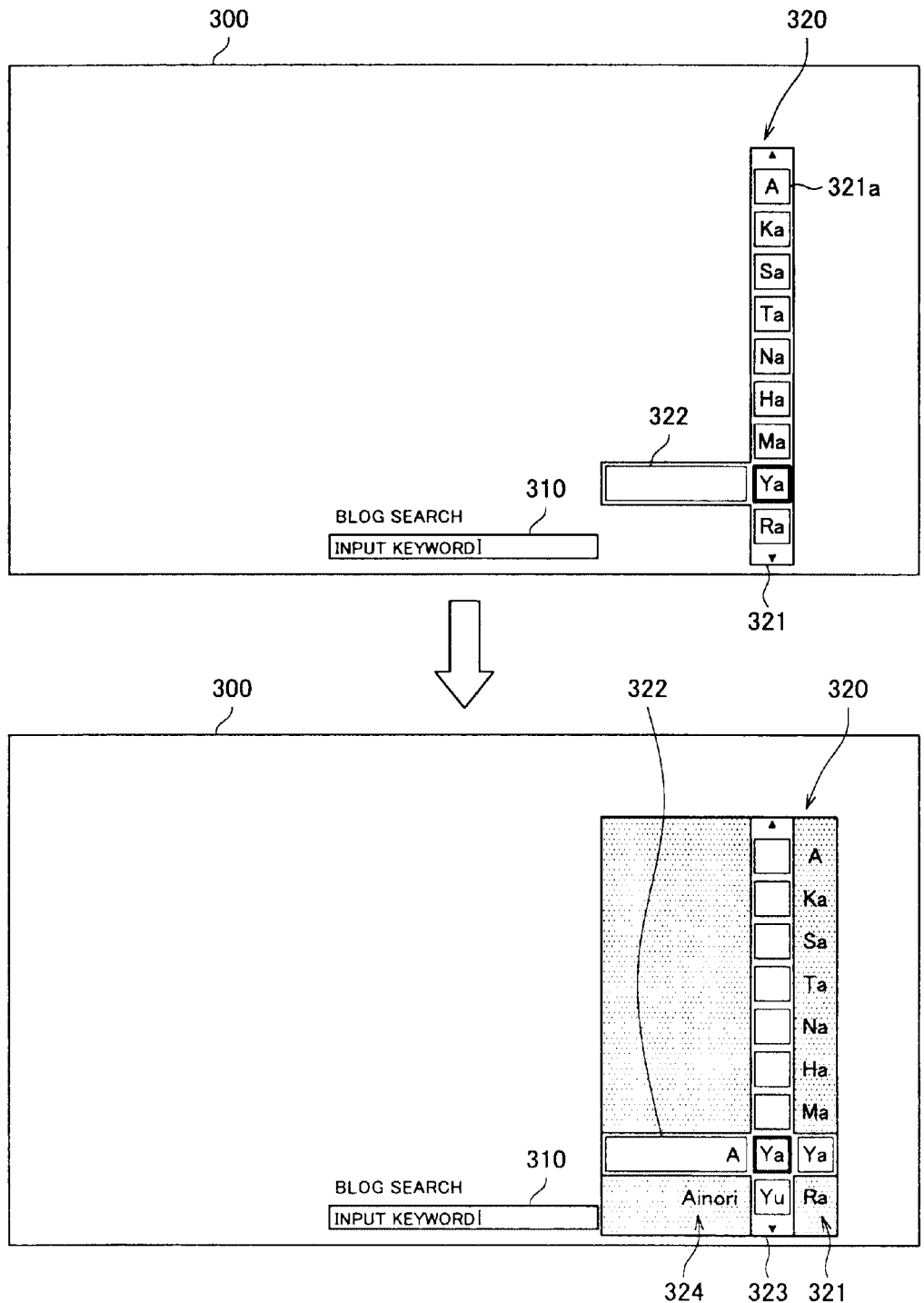
FIG. 8 is an explanatory diagram showing a display example of the software keyboard of the time when the display position control of the software keyboard is performed by the information processing apparatus according to the embodiment.

Moreover, as shown in FIG. 8, even when the input area 310 is displayed at the bottom of the display area 300, the display control unit 140 makes the focus part 322 follow the input area 310. Here, the cells 321a positioned above and below a focused cell 321a are also caused to be displayed in the first character list 321 or the like, so that the focus part 322 cannot be moved to the bottom of the display area 300 in the same manner as the input area 310. In this case, the focus part 322 is moved to the bottom of the movable area of the focus part 322, as shown in FIG. 8.

On the other hand, the first character list 321 is displayed so as to extend upward from the bottom of the area in which the software keyboard 320 can be displayed in the display area 300. This is to cause the first character list 321 and the focus part 322 to be crossed and to cause the first character list 321 to be displayed as closely to the input area 310 as possible for facilitating word input. Whether the first character list 321 is to be displayed in the upper part or in the lower part of the display area 300 can be determined based on the display position of the input area 310. For example, the display area 300 is divided vertically into two, and when the input area 310 is positioned in the upper side area, the first character list 321 is displayed in the upper part (downward from the top). On the other hand, when the input area 310 is positioned in the lower side area, the first character list 321 is displayed in the lower part (upward from the bottom).

Then, the display control unit 140 focuses, in the displayed first character list 321, the cell 321a of "Ya" which is closest to the intersection of the focus part 322 extending in the horizontal direction and the first character list 321. Then, even in the state where the first character list 321, the subordinate character list 323, and the expected word list 324 of the software keyboard 320 are displayed as shown in the lower diagram of FIG. 8, the maximum display area of the software keyboard 320 is secured. Consequently, all the keys can be displayed.

Figure 9:
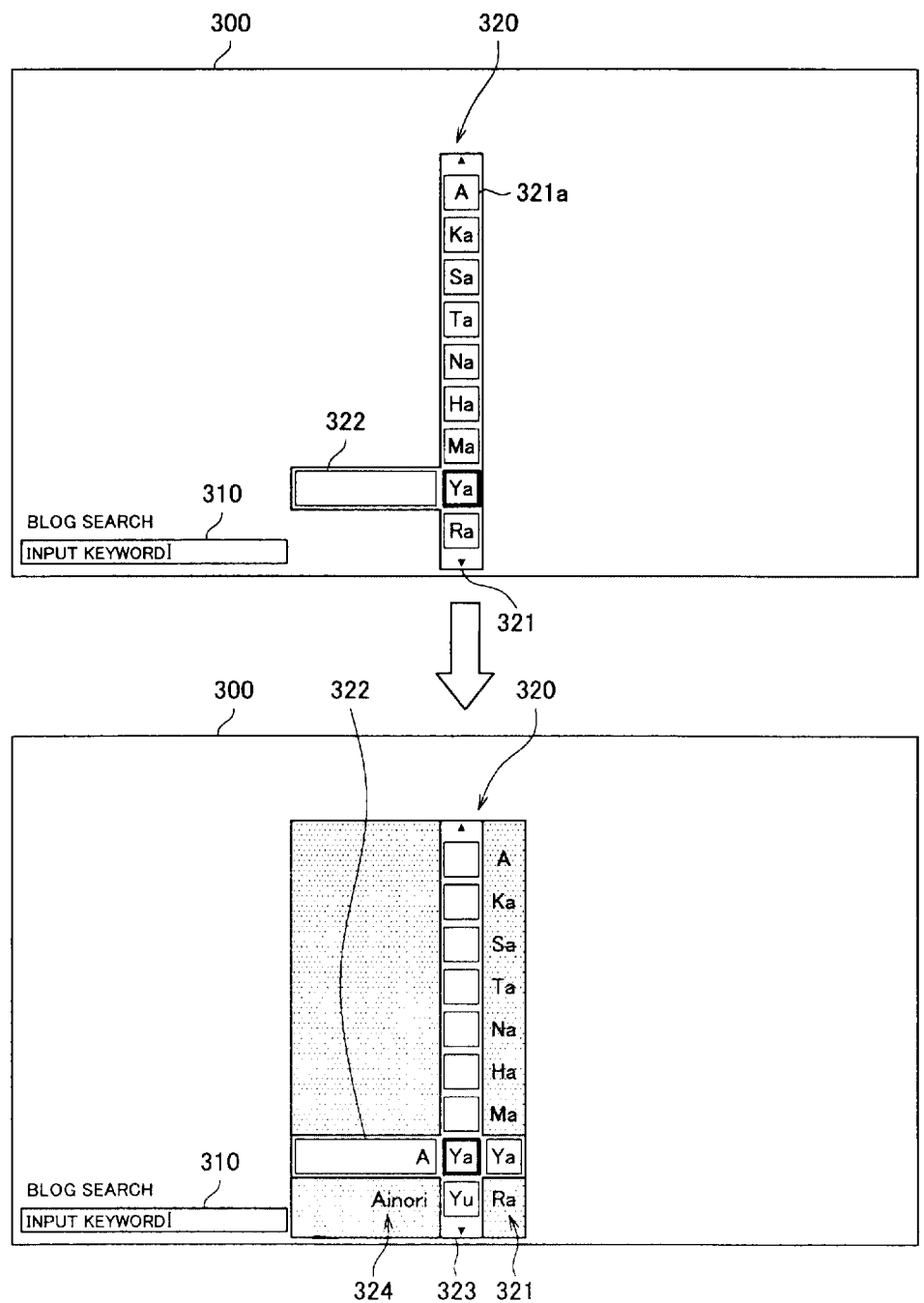
FIG. 9 is an explanatory diagram showing a display example of the software keyboard of the time when the display position control of the software keyboard is performed by the information processing apparatus according to the embodiment.

Furthermore, as shown in FIG. 9, even when the input area 310 is displayed at the bottom and in the leftmost part of the display area 300, the display control unit 140 makes the focus part 322 follow the input area 310. The focus part 322 is moved, in terms of the vertical direction of the display area 300, to the bottom of the movable area of the focus part 322 in the same manner as in FIG. 8. Then, in terms of the horizontal direction of the display area 300, the focus part 322 is moved to the left with the movement of the input area 310 to the left. Consequently, the software keyboard 320 is moved to the left compared to the case in FIG. 8 and displayed.

The first character list 321 is displayed, in the same manner as in FIG. 8, so as to extend upward from the bottom of the area in which the software keyboard 320 can be displayed in the display area 300. Then, the display control unit 140 focuses, in the displayed first character list 321, the cell 321a of "Ya" which is closest to the intersection of the focus part 322 extending in the horizontal direction and the first character list 321. After that, even in the state where the first character list 321, the subordinate character list 323, and the expected word list 324 of the software keyboard 320 are displayed as shown in the lower diagram of FIG. 9, the maximum display area of the software keyboard 320 is secured. Consequently, all the keys can be displayed.

Figure 10:
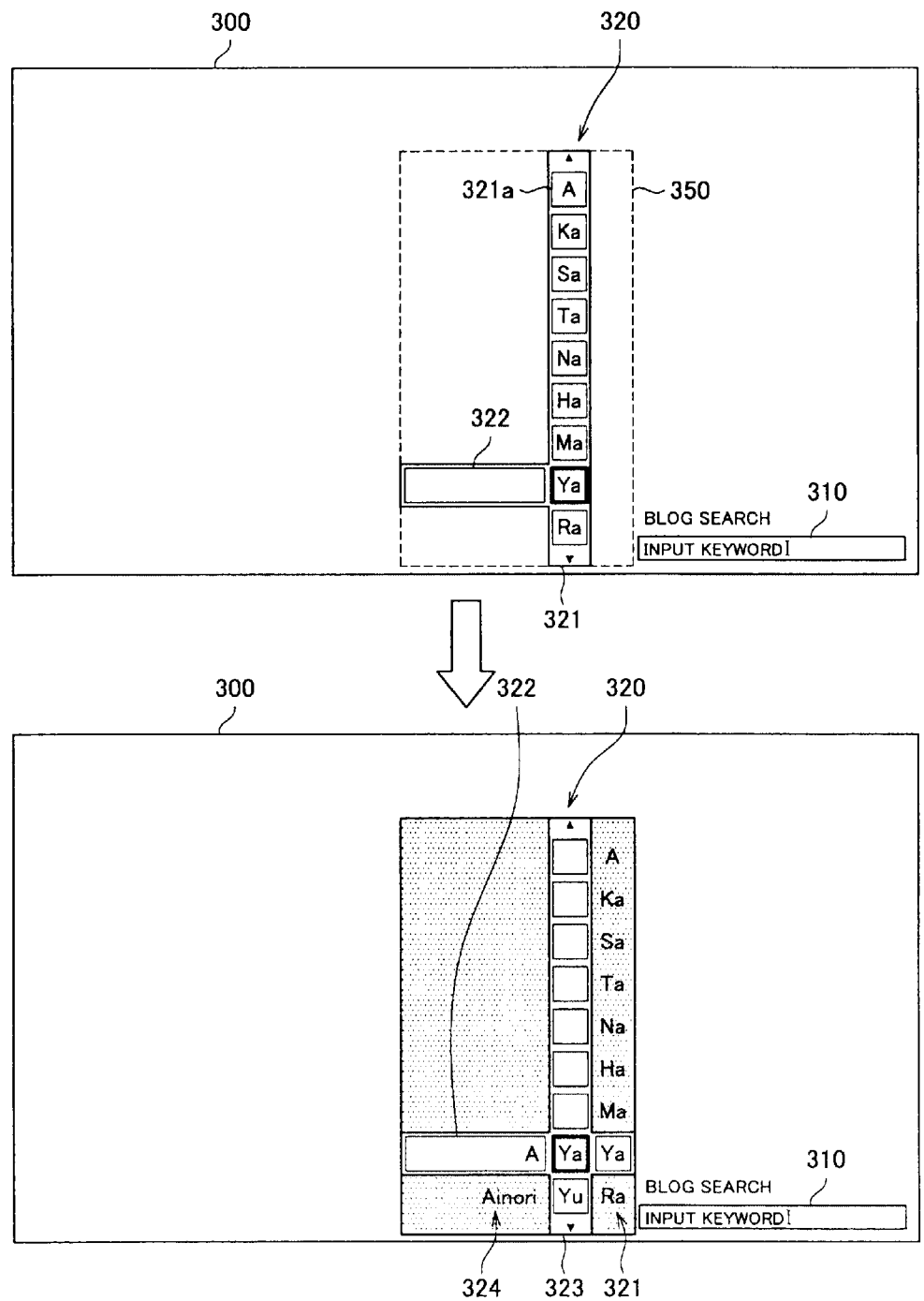
FIG. 10 is an explanatory diagram showing a display example of the software keyboard of the time when the display position control of the software keyboard is performed by the information processing apparatus according to the embodiment.

On the other hand, as shown in FIG. 10, when the input area 310 is displayed at the bottom and in the rightmost part of the display area 300, the display control unit 140 makes the focus part 322 follow the input area 310 in the manner described below. The display control unit 140 moves the focus part 322, in terms of the vertical direction of the display area 300, to the bottom of the movable area of the focus part 322 in the same manner as in FIG. 8. In terms of the horizontal direction, since the input area 310 is moved to the rightmost, the software keyboard 320 cannot be displayed on the right side of the input area 310. Consequently, the display control unit 140 causes the software keyboard 320 to be displayed on the left side of the input area 310.

At this time, the display control unit 140 considers the maximum display area 350 necessary for displaying the software keyboard 320 and determines the horizontal position of the focus part 322. The maximum display area 350 of the software keyboard 320 according to the present embodiment is the area in the state where the focus part 322, the first character list 321, and the subordinate character list 323 are displayed (in the lower diagram of FIG. 10). At this time, the focus part 322 is horizontally adjacent to the input area 310 across the first character list 321 and the subordinate character list 323. Consequently, the display control unit 140 displays the focus part 322, leaving room for the width of the first character list 321 and the subordinate character list 323 in the left direction from the display position of the input area 310. In this manner, the software keyboard 320 can be displayed on the left side of the input area 320, as shown in the lower diagram of FIG. 10.

In addition, the display control unit 140 obtains the sizes of the displayable areas of the software keyboard 320 on the left and right of the input area 310, and the display control unit 140 may determine the position in which the software keyboard 320 is displayed so as to cause the software keyboard 320 to be displayed on the side where there is the displayable area larger than the maximum display area 350. In the case where both of the displayable areas on the left and right are larger than the maximum display area 350, the software keyboard 320 may be displayed, giving priority to either of the sides (e.g., on the right side) by considering the facility of word input.

The first character list 321 is displayed, in the same manner as in FIG. 8, so as to extend upward from the bottom of the area in which the software keyboard 320 can be displayed in the display area 300. Then, the display control unit 140 focuses, in the displayed first character list 321, the cell 321a of "Ya" which is closest to the intersection of the focus part 322 extending in the horizontal direction and the first character list 321. After that, even in the state where the first character list 321, the subordinate character list 323, and the expected word list 324 of the software keyboard 320 are displayed as shown in the lower diagram of FIG. 10, the maximum display area of the software keyboard 320 is secured. Consequently, all the keys can be displayed.

(Case Where Input Area is Displayed at the Top of Display Area)

Figure 11:
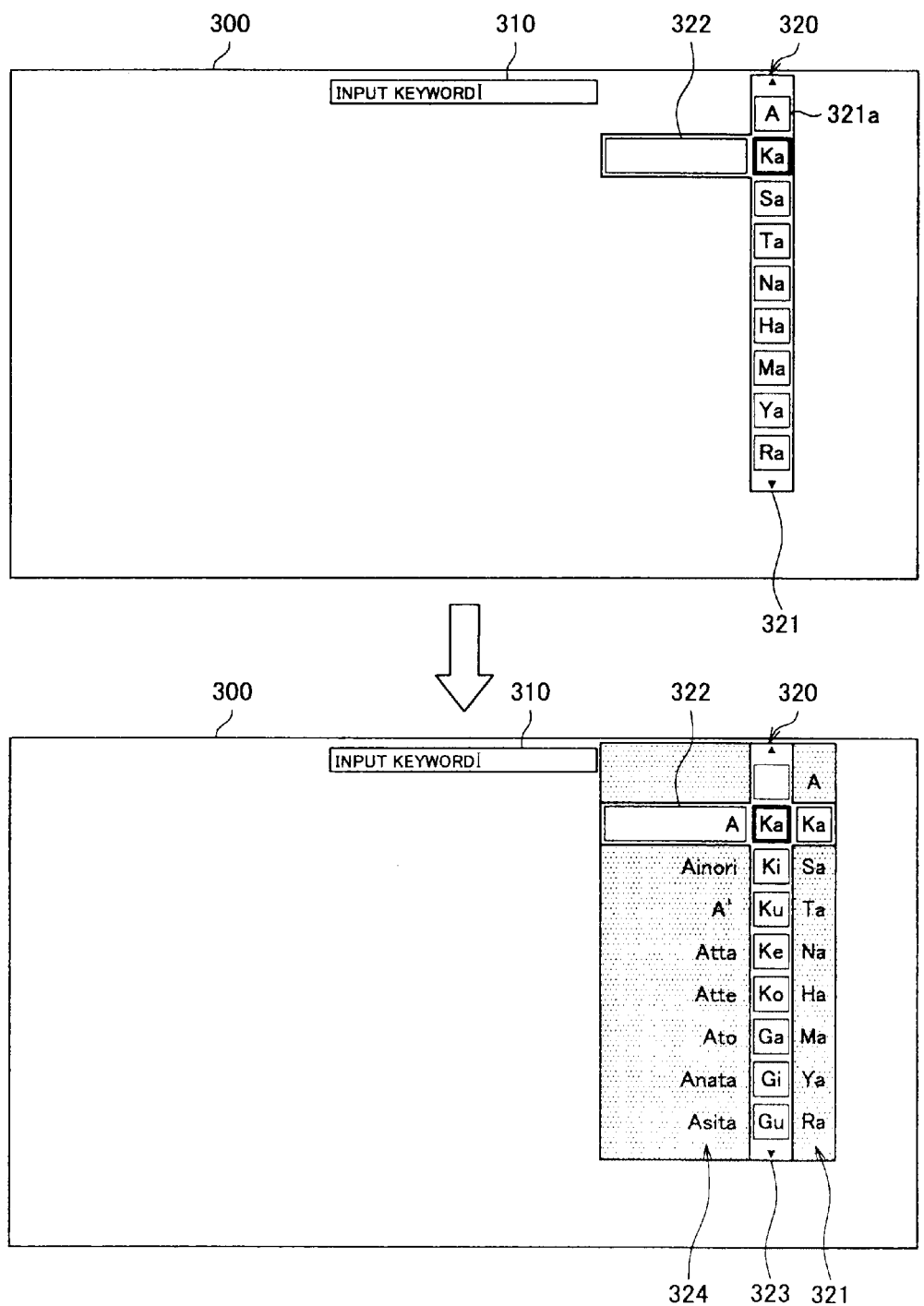
FIG. 11 is an explanatory diagram showing a display example of the software keyboard of the time when the display position control of the software keyboard is performed by the information processing apparatus according to the embodiment.

Moreover, on the contrary to FIG. 8, as shown in FIG. 11, even when the input area 310 is displayed at the top of the display area 300, the display control unit 140 makes the focus part 322 follow the input area 310. As described above, the cells 321a positioned above and below a focused cell 321a are also caused to be displayed in the first character list 321 or the like, so that the focus part 322 cannot be moved to the top of the display area 300 in the same manner as the input area 310. In this case, the focus part 322 is moved to the top of the movable area of the focus part 322, as shown in FIG. 11.

On the other hand, the first character list 321 is displayed so as to extend downward from the top of the area in which the software keyboard 320 can be displayed in the display area 300. Then, the display control unit 140 focuses, in the displayed first character list 321, the cell 321a of "Ka" which is closest to the intersection of the focus part 322 extending in the horizontal direction and the first character list 321. Then, even in the state where the first character list 321, the subordinate character list 323, and the expected word list 324 of the software keyboard 320 are displayed as shown in the lower diagram of FIG. 11, the maximum display area of the software keyboard 320 is secured. Consequently, all the keys can be displayed.

Figure 12:
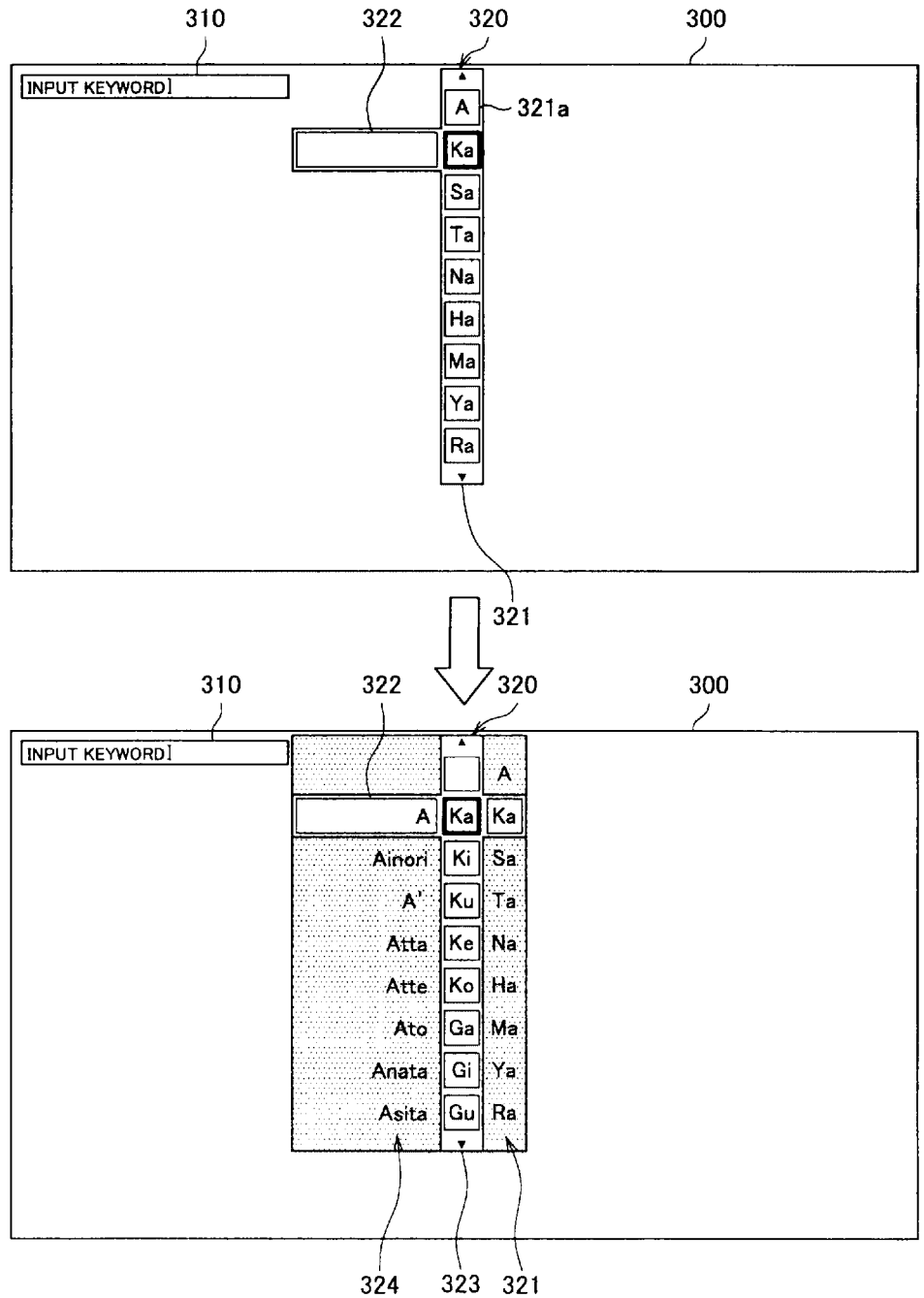
FIG. 12 is an explanatory diagram showing an explanatory diagram showing a display example of the software keyboard of the time when the display position control of the software keyboard is performed by the information processing apparatus according to the embodiment.

Furthermore, as shown in FIG. 12, even when the input area 310 is displayed at the top and in the leftmost part of the display area 300, the display control unit 140 make the focus part 322 follow the input area 310. The focus part 322 is moved, in terms of the vertical direction of the display area 300, to the top of the movable area of the focus part 322 in the same manner as in FIG. 11. Then, in terms of the horizontal direction of the display area 300, the focus part 322 is moved to the left with the movement of the input area 310 to the left. Consequently, the software keyboard 320 is moved to the left compared to the case in FIG. 11 and displayed.

The first character list 321 is displayed, in the same manner as in FIG. 11, so as to extend downward from the top of the area in which the software keyboard 320 can be displayed in the display area 300. Then, the display control unit 140 focuses, in the displayed first character list 321, the cell 321a of "Ka" which is closest to the intersection of the focus part 322 extending in the horizontal direction and the first character list 321. After that, even in the state where the first character list 321, the subordinate character list 323, and the expected word list 324 of the software keyboard 320 are displayed as shown in the lower diagram of FIG. 12, the maximum display area of the software keyboard 320 is secured. Consequently, all the keys can be displayed.

On the other hand, as shown in FIG. 13, when the input area 310 is displayed at the top and in the rightmost part of the display area 300, the display control unit 140 moves the focus part 322, in terms of the vertical direction of the display area 300, to the top of the movable area of the focus part 322 in the same manner as in FIG. 11. In terms of the horizontal direction, since the input area 310 is moved to the rightmost, the software keyboard 320 cannot be displayed on the right side of the input area 310. Consequently, the display control unit 140 causes the software keyboard 320 to be displayed on the left side of the input area 310. At this time, the display control unit 140 considers the maximum display area 350 necessary for displaying the software keyboard 320 and determines the horizontal position of the focus part 322, in the same manner as in FIG. 10. That is, the display control unit 140 displays the focus part 322, leaving room for the width of the first character list 321 and the subordinate character list 323 in the left direction from the display position of the input area 310. In this manner, the software keyboard 320 can be displayed on the left side of the input area 320, as shown in the upper diagram of FIG. 13.

The first character list 321 is displayed, in the same manner as in FIG. 11, so as to extend downward from the top of the area in which the software keyboard 320 can be displayed in the display area 300. Then, the display control unit 140 focuses, in the displayed first character list 321, the cell 321a of "Ka" which is closest to the intersection of the focus part 322 extending in the horizontal direction and the first character list 321. After that, even in the state where the first character list 321, the subordinate character list 323, and the expected word list 324 of the software keyboard 320 are displayed as shown in the lower diagram of FIG. 13, the maximum display area of the software keyboard 320 is secured. Consequently, all the keys can be displayed.

The display position control of the software keyboard 320 by the information processing apparatus 100 according to the present embodiment has been described above. In this manner, by making the display position of the software keyboard 320 follow the movement of the input area 310, word input can be facilitated.

[Word Input by Software Keyboard]

Next, a specific operation example of word input by using the software keyboard 320 according to the present embodiment will be described based on FIG. 14A to FIG. 14L. In addition, FIG. 14A to FIG. 14L are explanatory diagrams showing a word input procedure by using the software keyboard 320 according to the present embodiment.

Assume that, as shown in FIG. 14A, the software keyboard 320 is displayed according to the display position of the input area 310 in the display area 300 by the method described above. At this time, in the first character list 321 of the software keyboard 320, there is focused a cell 321a at the position intersecting with the direction of the input area 310 and the focus part 322 arranged side by side in the horizontal direction of the display area 300. In the initial state in which the software keyboard 320 is displayed, the first character ("A" in the case of FIG. 14A) is displayed in the focused cell 321a.

A user scrolls the first character list 321 in the vertical direction by moving a thumb in the vertical direction on the operation surface 224 of the sensor unit 220 of the input device 200. For example, if the thumb is moved upward for only a predetermined distance on the operation surface 224, as shown in FIG. 14B, the first character list 321 displayed in the display area 300 is moved upward. Then, the cell 321a of "Ka" below the cell 321a of "A" focused in FIG. 14A is focused.

When a selection button is pressed on the input device 200 side in the condition shown in FIG. 14B, "Ka" focused in the first character list 321 is selected. When such processing has been performed, the display control unit 140 moves the display position of the first character list 321 to the right side and causes the subordinate character list 323 to be displayed between the focus part 322 and the first character list 321 as shown in FIG. 14C. The subordinate character list 323 displays a list of characters subordinate to the character selected in the first character list 321. For example, when "Ka" is selected in the first character list 321, characters for voiceless and voiced consonants subordinate to the row of "Ka" of the 50-character kana syllabary are displayed in the subordinate character list 323, for example, and the first character ("Ka" in the case of FIG. 14C) of the list is displayed in a focused cell 323a.

The user scrolls the subordinate character list 323 in the vertical direction by moving the thumb in the vertical direction on the operation surface 224 of the sensor unit 220 of the input device 200. For example, if the thumb is moved upward, as shown in FIG. 14D, the subordinate character list 323 displayed in the display area 300 is moved upward, and the cell 323a of "Ki" below the cell 323a of "Ka" focused in FIG. 14C is focused.

When the determination button is pressed on the input device 200 side in the condition shown in FIG. 14D, input of "Ki" which has been focused in the subordinate character list 323 is determined. The character whose input has been determined is displayed within the cell of the focus part 322. Then, the display control unit 140 causes the subordinate character list 323 to be hidden and moves the display position of the first character list 321 to the left side with the first character list 321 kept in the display state in FIG. 14D. By this, the first character list 321 becomes the object of operation by the input device 200.

Moreover, in the case where there are character strings (expected character strings) expected to be input by the user in the characters having been input so far, the software keyboard 230 is expanded and the expected word list 324 is displayed below the focus part 322, as shown in FIG. 14E. The expected word list 324 is character stings arranged substantially parallel to the first character list 321, namely, in the vertical direction, below the focus part 322.

Here, when the software keyboard 320 is expanded, the occupied area of the software keyboard 320 in the display area 300 becomes larger and the area for displaying other information becomes smaller. Consequently, in order for the user to be able to also recognize the content displayed on the back side of the software keyboard 320, the elements of the software keyboard 320 other than the list and the focus part 322 which are the objects of operation are made transparent (e.g., made translucent) and displayed. This makes possible to display the software keyboard 320 without largely interfering with the display of the content displayed in the display area 300.

Figure 14G:
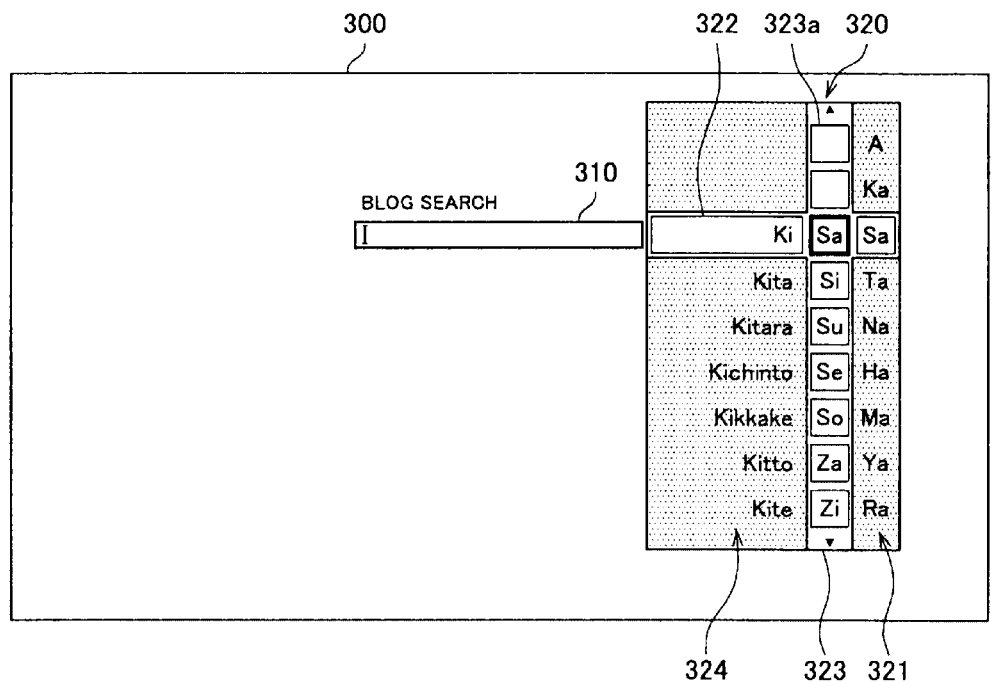
FIG. 14G is an explanatory diagram showing a word input procedure by using the software keyboard according to the present embodiment.

After that, the software keyboard 320 is operated and input characters are determined in the same manner as the above. For example, from the state in FIG. 14E, the user moves the thumb upward for only a predetermined distance on the operation surface 224 of the sensor unit 220 of the input device 200 and causes the first character list 321 displayed in the display area 300 to be moved upward as shown in FIG. 14F. Then, when the determination button is pressed in the state in which the cell 321a of "Sa" in the first character list 321 is focused, the display control unit 140 moves the display position of the first character list 321 to the right as shown in FIG. 14G. Then, the subordinate character list 323 is caused to be displayed between the focus part 322 and the first character list 321.

Figure 14H:
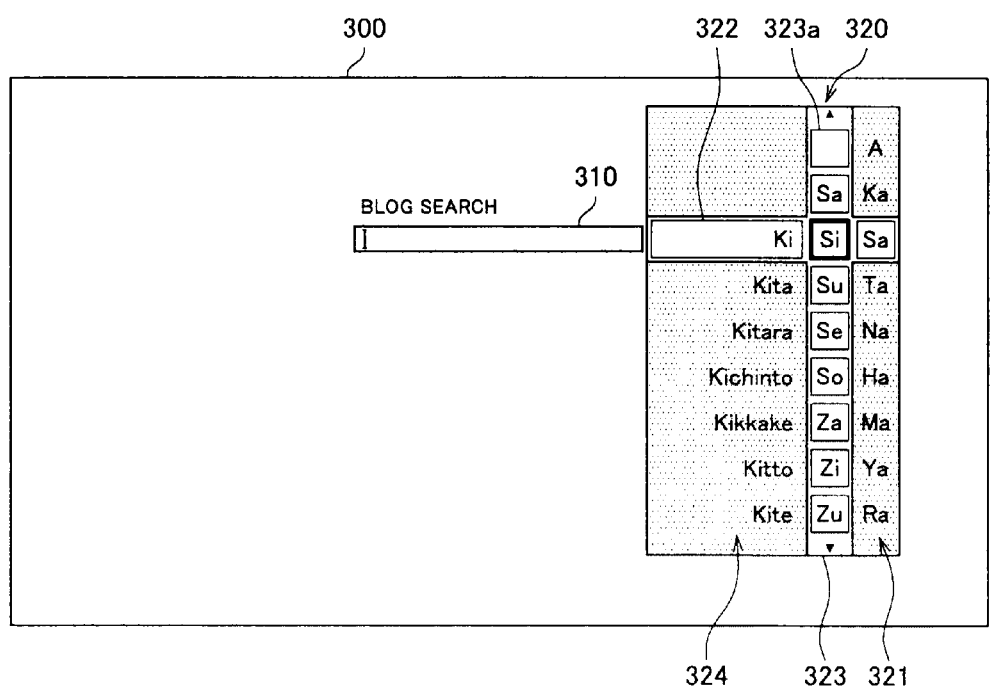
FIG. 14H is an explanatory diagram showing a word input procedure by using the software keyboard according to the present embodiment.
Figure 14I:
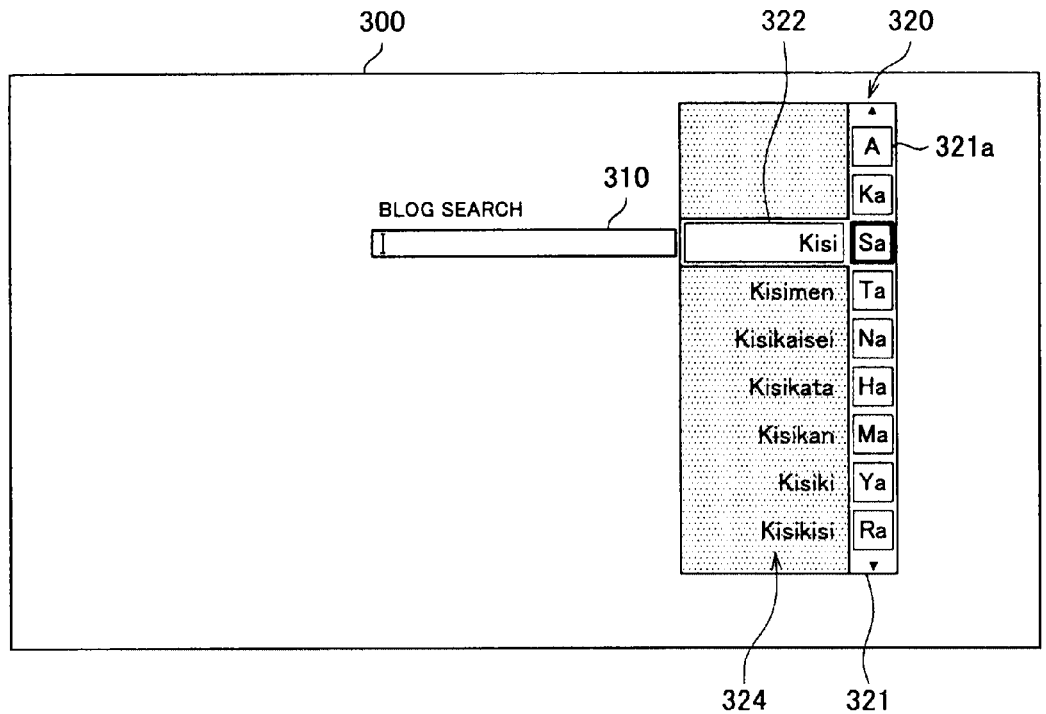
FIG. 14I is an explanatory diagram showing a word input procedure by using the software keyboard according to the present embodiment.

Furthermore, the user moves the thumb upward for only a predetermined distance on the operation surface 224 of the sensor unit 220 of the input device 200 and causes the subordinate character list 323 displayed in the display area 300 to be moved upward as shown in FIG. 14H. Then, when the determination button is pressed in the state in which the cell 323a of "Si" in the subordinate character list 323 is focused, the character "Si" whose input is determined is displayed within the cell of the focus part 322. Moreover, the display control unit 140 causes the subordinate character list 323 to be hidden and moves the display position of the first character list 321 to the left side with the first character list 321 kept in the display state in FIG. 14H. Furthermore, in the case where there are expected character strings in the characters having been input so far, the expected word list 324 in which the expected character strings are arranged in the vertical direction below the focus part 322 is displayed as shown in FIG. 14I.

Figure 14J:
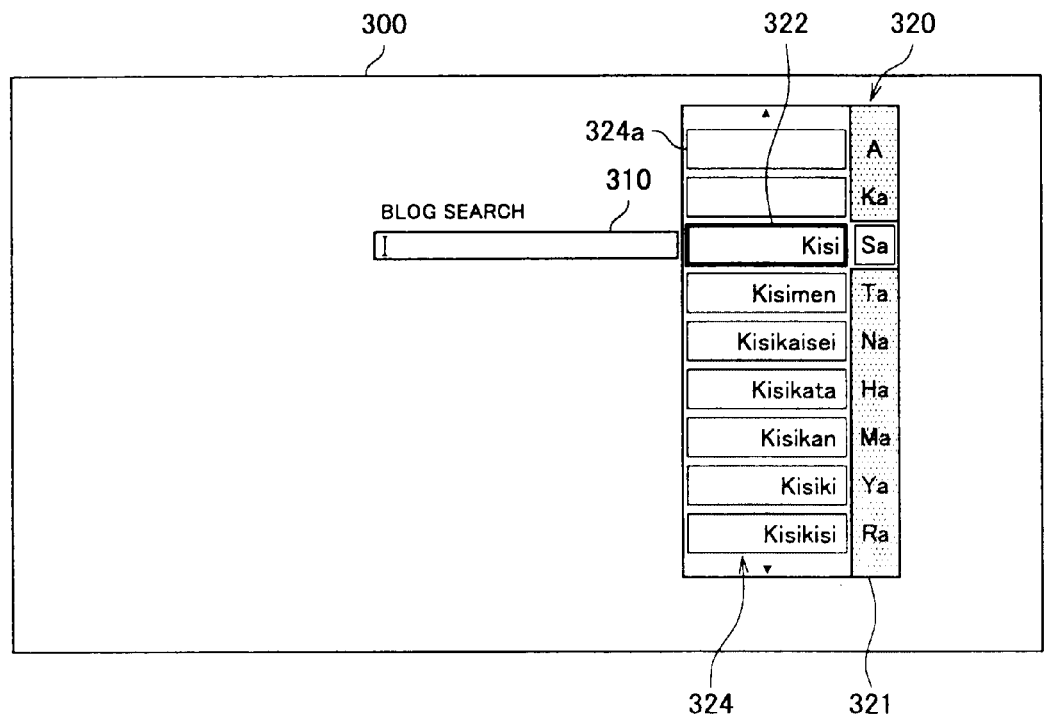
FIG. 14J is an explanatory diagram showing a word input procedure by using the software keyboard according to the present embodiment.

In the case where there is a character string which the user desires to input in the expected word list 324, the user moves the thumb to the left on the operation surface 224 of the sensor unit 220 of the input device 200 and causes the focus to be moved to the cell of the focus part 322. Then, when the focus has been moved as shown in FIG. 14J, the expected word list 324 becomes the object of operation by the input device 200. The user moves the thumb in the vertical direction on the operation surface 224 to scroll the subordinate character list 323 in the vertical direction and causes the expected character string which the user desires to input to be moved to the cell of the focus part 322.

Then, as shown in FIG. 14K, when the determination button is pressed on the input device 200 side when the expected character string desired to be input is focused, the display control unit 140 causes the characters in the cell of the focus part 322 to be displayed in the input area 310 as shown in FIG. 14L. Then, the display control unit 140 clears the display within the cell of the focus part 322 and causes the expected word list 324 having been displayed below the focus part 322 to be hidden. Moreover, the display control unit 140 makes the first character list 321 operable by the input device 200. That is, the software keyboard 320 is made able to input a new word.

By operating the software keyboard 320 in this manner, a word can be input in the input area 310. After a keyword is input to the input area 310, the user operates the input device 200 and causes a search to be initiated.

In the software keyboard 320 according to the present embodiment, the input area 310 and the focus part 322 are arranged in the same horizontal straight line, thereby facilitating word input into the input area 310. Moreover, since the expansion direction of the software keyboard 320 is also the same as the array direction of the input area 310 and the focus part 322, so that change in the form of the software keyboard 320 at the time of word input is also not visually annoying.

Furthermore, the scroll direction of the first character list 321, the subordinate character list 323, and expected word list 324 from which input candidate characters are selected are unified to the same direction (the vertical direction in the present embodiment). In this manner, by unifying the direction of operation, input operation can be performed intuitively compared to the case where different operation is made for each time of input operation, so that the software keyboard 320 can be easily operated. Moreover, by making input operation in the input device 200 be an operation strongly related with the scroll direction of the lists, which is to move the thumb in the vertical direction on the operation surface 224, operability of the software keyboard 320 can be further improved.

[Other Configuration Examples of Software Keyboard]

Although the software keyboard 320 described above is used for inputting kana characters, a software keyboard 320 for inputting other characters can be also configured in the same manner. For example, as shown in FIG. 15, a software keyboard 320 for inputting alphabetical letters is shown. A plurality of alphabetical letters is subordinate to each of cells 321a of a first letters list 321, and when a cell 321a is selected in the first letter list 321, the upper case letters, lower case letters and the like of the alphabet subordinate to the cell 321a are displayed in a subordinate letter list 323. Moreover, in the same manner as the above, a expected word list 324 including expected letter strings expected to be input may be displayed below a focus part 322.

Figure 16:
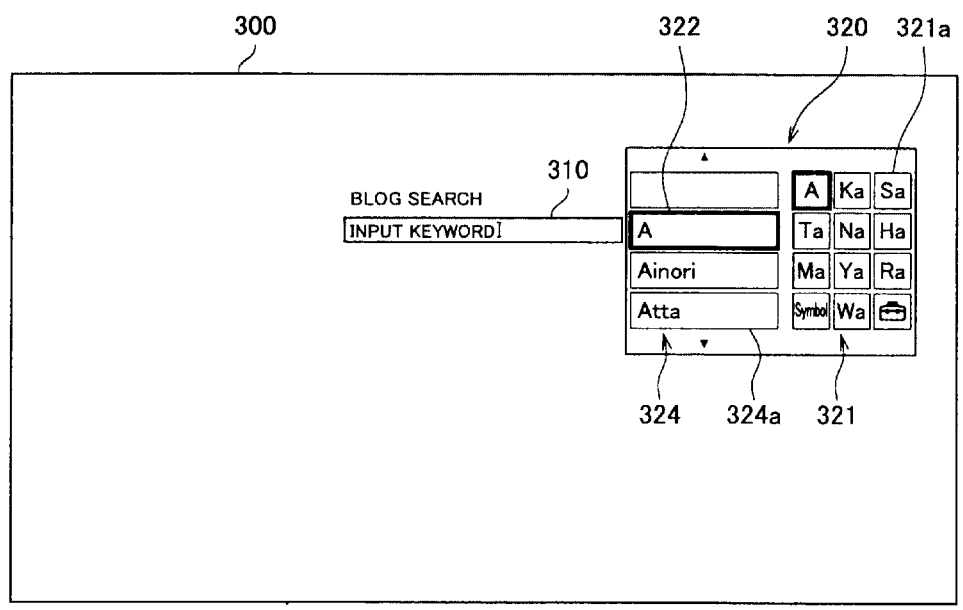
FIG. 16 is an explanatory diagram showing another configuration example of the software keyboard.

Moreover, keys of the software keyboard 320 may be arranged in the manner as shown in FIG. 16. Also in this case, the input area 310 and the focus part 322 of the software keyboard 320 are displayed side by side in a horizontal row. Moreover, the first letter list 321 is arranged like a numeric keypad, and cells 321a can be focused and moved one by one by moving a thumb in a predetermined direction (e.g., in the vertical direction) on an operation surface 224 of a sensor unit 220 of an input device 200. Such configuration of the software keyboard 320 can reduce the size necessary for displaying the software keyboard 320 and can prevent information displayed in the other part of the display area 300 from being interfered with.

<3. Hardware Configuration Example>

Figure 17:
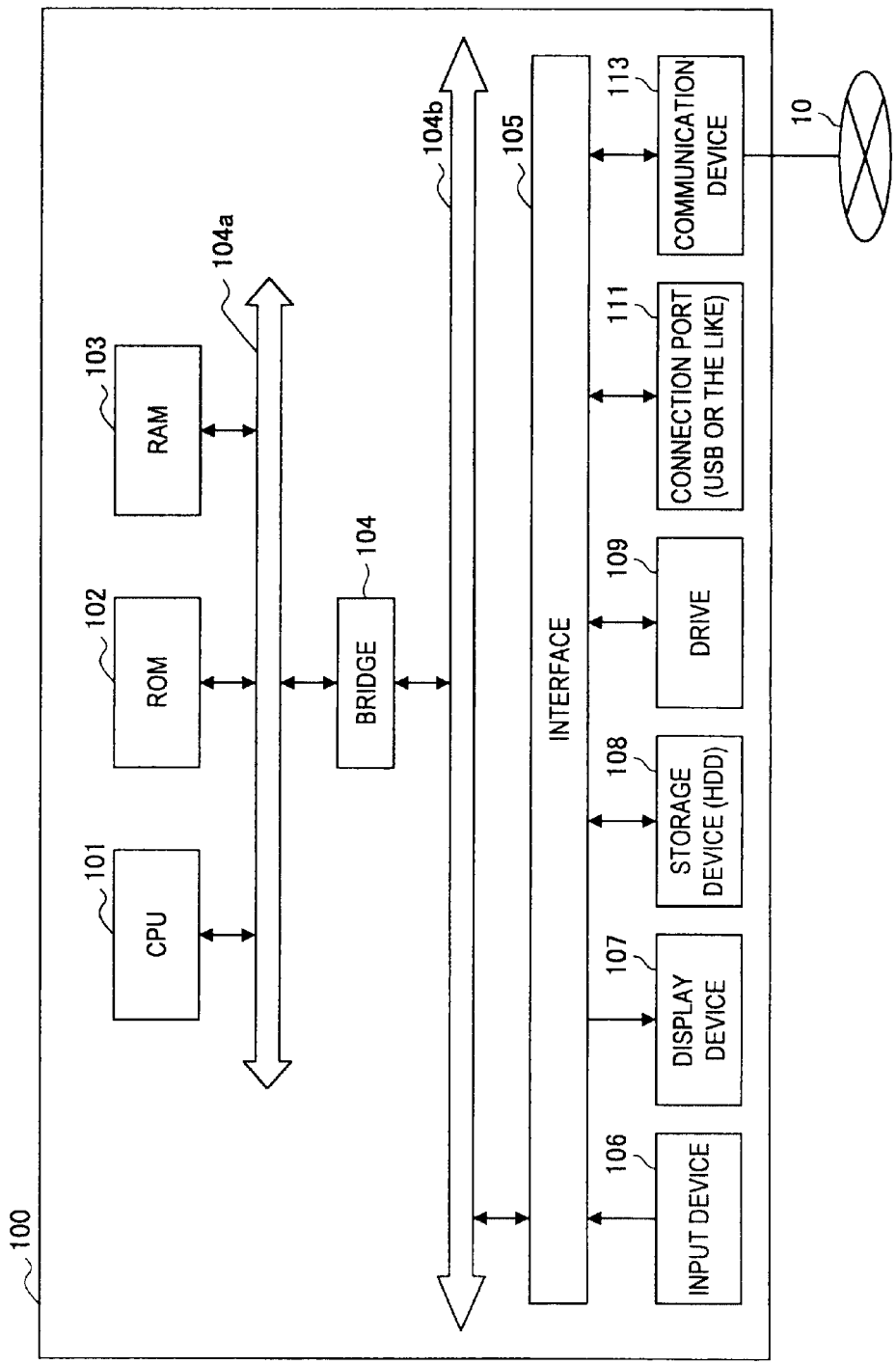
FIG. 17 is a block diagram showing a configuration example of hardware of the information processing apparatus which is a component of the input unit according to the embodiment.
Figure 18:
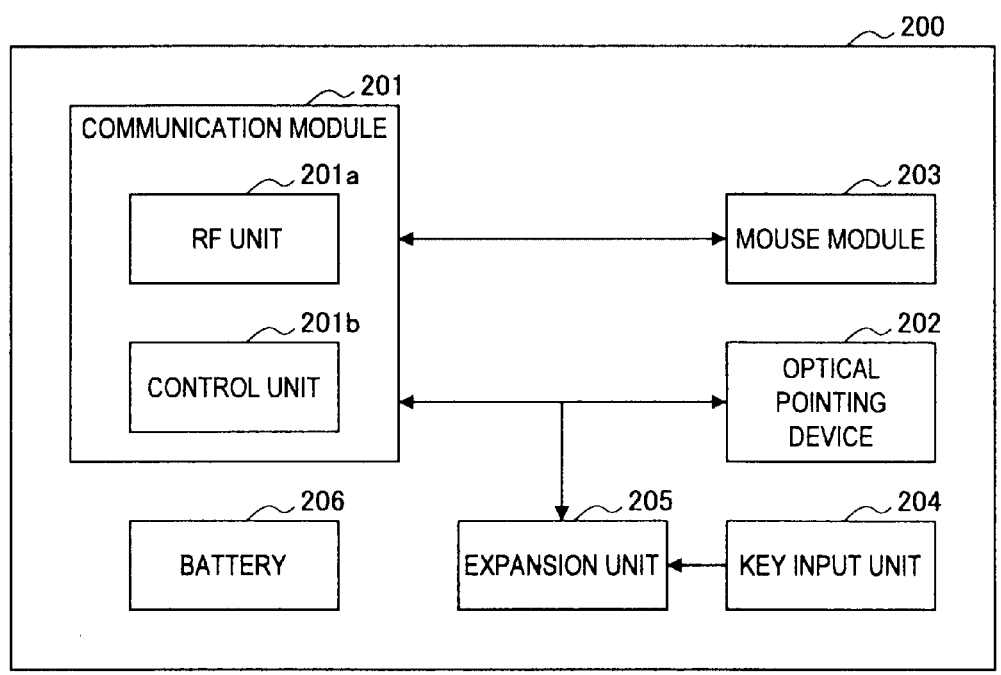
FIG. 18 is a block diagram showing a configuration example of hardware of the input device which is a component of the input unit according to the embodiment.

The information processing apparatus 100 according to the present embodiment can be executed by hardware or by software. In this case, the information processing apparatus 100 also includes a computer as such shown in FIG. 17. In the following, a hardware configuration of the information processing apparatus 100 according to the present embodiment will be described based on FIG. 17. Furthermore, a hardware configuration of the input device 200 according to the present embodiment will be described based on FIG. 18. In addition, FIG. 17 is a block diagram showing a configuration example of hardware of the information processing apparatus 100 which is a component of the input unit according to the present embodiment. FIG. 18 is a block diagram showing a configuration example of hardware of the input device 200 which is a component of the input unit according to the present embodiment.

(Hardware Configuration Example of Information Processing Apparatus)

The information processing apparatus 100 which is a component of the input unit according to the present embodiment can be realized by a processing device such as a personal computer as described above. The information processing apparatus 100 includes, as shown in FIG. 17, a CPU (Central Processing Unit) 101, a ROM (Read Only Memory) 102, a RAM (Random Access Memory) 103, and a host bus 104a. Moreover, information processing apparatus 100 includes a bridge 104, an external bus 104b, an interface 105, an input device 106, an output device 107, a storage device (HDD) 108, a drive 109, a connection port 111, and a communication device 113.

The CPU 101 functions as an arithmetic processing device and a control device and controls the entire operation within the information processing apparatus 100 according to a variety of programs. Moreover, the CPU 101 may be a microprocessor. The ROM 102 stores therein programs, calculation parameters and the like used by the CPU 101. The RAM 103 temporarily stores therein programs used in the execution of the CPU 101 and parameters that change appropriately in the execution, for example. These are interconnected via the host bus 104a including a CPU bus and the like.

The host bus 104a is connected to the external bus 104b such as a PCI (Peripheral Component Interconnect/Interface) bus via the bridge 104. Incidentally, the host bus 104a, the bridge 104, and the external bus 104b are not necessarily configured separately and the functions thereof may be implemented in one bus.

The input device 106 includes an input means for a user to input information, such as a mouse, a keyboard, a touch panel, a button, a microphone, a switch, and a lever and an input control circuit for generating an input signal based on the input by the user and outputting the input signal to the CPU 101. The user of the information processing apparatus 100 can input various types of data and give an instruction for performing processing operation to the information processing apparatus 100 by operating the input device 106.

The output device 107 includes, for example, a display device such as a CRT (Cathode Ray Tube) display, a liquid crystal display (LCD), an OLED (Organic Light Emitting Display) and a lamp. Furthermore, the output device 107 includes an audio output device such as a speaker and a headphone. In the present embodiment, a display unit 140 described below is provided as the output device 107 as shown in FIG. 3.

The storage device 108 is a device for data storage configured as an example of a storage unit of the information processing apparatus 100. The storage device 108 may include a storage medium, a recording device for recording data in the storage medium, a reading device for reading out the data from the storage medium, and a deletion device for deleting the data recorded in the storage medium. The storage device 108 includes a HDD (Hard Disk Drive), for example. This storage device 108 drives a hard disk and stores therein the programs or various types of data executed by the CPU 101.

The drive 109 is a reader/writer for storage medium and is built into or attached outside the information processing apparatus 100. The drive 109 reads out information recorded in a removable recording medium attached thereto such as a magnetic disk, an optical disk, a magneto-optical disk, or a semiconductor memory, and outputs the information to the RAM 103.

The connection port 111 is an interface connected to an external device and is a connection port capable of transmitting data to the external device via a USB (Universal Serial Bus) and the like. Moreover, the communication device 113 is a communication interface including a communication device for connecting to a communication network 15, for example. Moreover, the communication device 113 may be a communication device designated for wireless LAN (Local Area Network), a communication device designated for wireless USB or a wire communication device for wire communication.

(Configuration Example of Hardware of Input Device)

The input device 200 which is a component of the input unit according to the present embodiment includes, as shown in FIG. 18, a communication module 201, an optical pointing device 202, and a mouse module 203. Moreover, the input device 200 further includes a key input unit 204, an expansion unit 205, and a battery 206.

The communication module 201 is a communication device for transmitting and receiving information to and from the information processing apparatus 100. The communication module 201 includes, for example, an RF unit 201a for performing high frequency wireless communication such as Bluetooth (registered trademark) and a control unit 201b for performing communication control. The optical pointing device 202, the mouse module 203 and the key input unit 204 are input means for inputting information to be transmitted by the communication module 201.

The optical pointing device 202 is a device for detecting movement of a finger and corresponds to the optical pointing device 222 of the sensor unit 220 described above. The optical pointing device 202 includes a control circuit for obtaining an image of a detection object (e.g., finger), for performing image processing on the obtained data and for performing interface processing with the communication module 201 and a light emitting unit such as a LED. The mouse module 203 is a module for realizing an input function of a general optical mouse and includes a light emitting unit for outputting light such as a LED or a laser light source, a light receiving unit for detecting the reflection of the light output by the light emitting unit, and a calculation processing unit for calculating the travel distance of the input device 200. The key input unit 204 is an input means such as a button, a switch, and a lever.

The information input from the optical pointing device 202, the mouse module 203, and the key input unit 204 by operating the input device 200 is converted into an input signal by the input control circuit or the like and output to the communication module 201. The expansion unit 205 may be provided between the key input unit 204 and the communication module 201. Moreover, the battery 206 is provided for causing the input device 200 to function wirelessly.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the embodiment described above, although the device for operating the software keyboard 320 is the input device 200 is a separate entity from information processing apparatus 100, the present invention is not limited to such example. For example, the software keyboard 320 may be directly operated by providing a touch sensor to the display unit 150 and touching the display area 300 with a finger or the like.

The present application contains subject matter related to that disclosed in Japanese Priority Patent Application JP 2009-194115 filed in the Japan Patent Office on Aug. 25, 2009, the entire content of which is hereby incorporated by reference.

What is claimed is:

1. An information processing apparatus comprising:
   a position acquisition unit to obtain a display position of an input area in a display area; and
   a display control unit to control, in the display area and based on the display position of the input area, a display position of an input operation area in which a character to be displayed in the input area is input,
   wherein the display control unit displays the input operation area at a position adjacent to the display position of the input area, and
   when the display position of the input area is moved, the display control unit makes the input operation area follow the movement of the input area, and
   the input operation area includes
      a list display part in which one or more input candidate characters are displayed for selection, and
      a focus part displayed in line with the input area and in which focus of one of the input candidate characters is indicated, and
   the input operation area expands to display additional character lists adjacent to the list display part in response to selection of one of the input candidate characters from the list display part.

2. The information processing apparatus according to claim 1, wherein the list display part includes the one or more input candidate characters arranged in a direction substantially orthogonal to an array direction of the input operation area and the focus part.

3. The information processing apparatus according to claim 1, wherein when a character is selected from the list display part, the display control unit displays a expected character list display part as one of the additional character lists, the expected character list display part including one or more expected characters expected to be input based on the selected character are arranged substantially parallel to the list display part.

4. The information processing apparatus according to claim 1, comprising:
   a movement information input unit to input movement information for moving the list display part in the array direction of the one or more input candidate characters, wherein an input direction of inputting the movement information is substantially the same as the array direction of the one or more input candidates of the list display part.

5. An information processing method, comprising:
   obtaining a display position of an input area in a display area;
   displaying adjacent to the display position of the input area an input operation area in which a character to be displayed in the input area is input; and
   making the input operation area follow movement of the input area when the display position of the input area moves
   wherein the input operation area includes
      a list display part in which one or more input candidate characters are displayed for selection, and
      a focus part displayed in line with the input area and in which focus of one of the input candidate characters is indicated, and
   the input operation area expands to display additional character lists adjacent to the list display part in response to selection of one of the input candidate characters from the list display part.

6. A non-transitory computer-readable medium storing computer-readable instructions thereon, the computer-readable instructions when executed by a computer cause the computer to perform a method, comprising:
   obtaining a display position of an input area in a display area;
   controlling, based on the display position of the input area in the display area, a display position of an input operation area in which a character to be displayed in the input area is input;
   displaying the input operation area adjacent to the display position of the input area; and
   making the input operation area follow the movement of the input area when the display position of the input area moves
   wherein the input operation area includes
      a list display part in which one or more input candidate characters are displayed for selection, and
      a focus part displayed in line with the input area and in which focus of one of the input candidate characters is indicated, and
   the input operation area expands to display additional character lists adjacent to the list display part in response to selection of one of the input candidate characters from the list display part.

7. The information processing apparatus according to claim 1, wherein the input operation area expands in a horizontal dimension.

8. The information processing apparatus according to claim 1, wherein a text entry portion of the input operation area is offset vertically relative to the input area when the input area is at an edge of the display area.

9. The information processing apparatus according to claim 1, wherein the input operation area expands in a direction opposite the focus part so that the focus part is not encompassed by the additional lists.

10. The information processing apparatus according to claim 1, wherein the input operation area expands in a direction of the focus part so that the focus part is encompassed by the additional lists.

* * * * *